(12) United States Patent
Kawakita

(10) Patent No.: US 11,409,888 B2
(45) Date of Patent: Aug. 9, 2022

(54) SECURITY INFORMATION PROCESSING DEVICE, INFORMATION PROCESSING METHOD, AND RECORDING MEDIUM

(71) Applicant: NEC Corporation, Tokyo (JP)

(72) Inventor: Masaru Kawakita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 16/963,641

(22) PCT Filed: Jan. 22, 2018

(86) PCT No.: PCT/JP2018/001727
§ 371 (c)(1),
(2) Date: Jul. 21, 2020

(87) PCT Pub. No.: WO2019/142345
PCT Pub. Date: Jul. 25, 2019

(65) Prior Publication Data
US 2021/0064761 A1      Mar. 4, 2021

(51) Int. Cl.
*G06F 21/00*      (2013.01)
*G06F 21/57*      (2013.01)
(Continued)

(52) U.S. Cl.
CPC .......... *G06F 21/577* (2013.01); *G06F 21/44* (2013.01); *G06F 21/54* (2013.01); *G06F 21/566* (2013.01); *G06F 21/88* (2013.01); *G06N 7/005* (2013.01)

(58) Field of Classification Search
CPC ........ G06F 21/577; G06F 21/44; G06F 21/54; G06F 21/566; G06F 21/88; G06N 7/005
(Continued)

(56) References Cited

U.S. PATENT DOCUMENTS 7,072,841 B1 *  7/2006  Pednault .............. G06Q 40/00
                                                705/4
8,688,501 B2 *  4/2014  Apte .................... G06Q 10/067
                                                705/7.28
(Continued)

FOREIGN PATENT DOCUMENTS

JP      2008-197877 A    8/2008
JP      2011-227852 A   11/2011
(Continued)

OTHER PUBLICATIONS

Tomoharu Iwata, "Topic model: Machine learning professional series", first edition, Kodansha, Apr. 2015, pp. 55-77 (12 pages total).

(Continued)

*Primary Examiner* — Josnel Jeudy
(74) *Attorney, Agent, or Firm* — Sughrue Mion, PLLC

(57) ABSTRACT

An efficient examination of a security threat that may affect a product is enabled. A security information processing device includes threat information model generation means for generating, by use of first threat information including threat information indicating a threat related to security, a threat information model capable of classifying a piece of information as the threat information, collection means for collecting one or more threat information candidates each being a candidate for the threat information, from an information source providing information related to security, and detection means for detecting, by use of information about a component constituting a product and the threat information model, second threat information including the threat information that may affect the product, from the collected one or more threat information candidates.

6 Claims, 17 Drawing Sheets

(51) Int. Cl.
*G06F 21/44* (2013.01)
*G06F 21/54* (2013.01)
*G06F 21/56* (2013.01)
*G06F 21/88* (2013.01)
*G06N 7/00* (2006.01)

(58) Field of Classification Search
USPC .......................................................... 726/22
See application file for complete search history.

(56) References Cited

U.S. PATENT DOCUMENTS

| | | | | |
|---|---|---|---|---|
| 10,681,071 | B1* | 6/2020 | Pendergast | H04L 63/1425 |
| 2004/0215551 | A1* | 10/2004 | Eder | G06Q 40/08 |
| | | | | 705/38 |
| 2009/0043637 | A1* | 2/2009 | Eder | G06N 7/005 |
| | | | | 705/35 |
| 2014/0172495 | A1* | 6/2014 | Schneck | G06Q 10/0635 |
| | | | | 705/7.28 |
| 2015/0381649 | A1* | 12/2015 | Schultz | H04L 63/1433 |
| | | | | 726/25 |
| 2016/0154960 | A1* | 6/2016 | Sharma | G06F 21/577 |
| | | | | 726/25 |
| 2016/0155069 | A1* | 6/2016 | Hoover | G06F 16/25 |
| | | | | 706/12 |
| 2019/0158517 | A1* | 5/2019 | Muddu | G06N 20/00 |
| 2019/0164015 | A1* | 5/2019 | Jones, Jr | G06K 9/6262 |
| 2019/0197442 | A1* | 6/2019 | Lu | G06Q 20/4016 |

FOREIGN PATENT DOCUMENTS

| | | |
|---|---|---|
| JP | 2011-248500 A | 12/2011 |
| JP | 2013-196403 A | 9/2013 |
| JP | 2017-224053 A | 12/2017 |
| WO | 2016/190883 A1 | 12/2016 |

OTHER PUBLICATIONS

Tomas Mikolov et al., "Efficient Estimation of Word Representations in VectorSpace", Proceedings of Workshop at ICLR, Sep. 7, 2013, pp. 1-12 (12pages total).

Tomas Mikolov et al., "Distributed Representations of Words and Phrases and their Compositionality", Proceedings of Advances in Neural Information Processing Systems 26 (NIPS 2013), 2013, pp. 1-9 (9 pages total).

Atsutoshi Kumagai et al., "A Method to Extract Security-related Tweets", IEICE Technical Report, Oct. 9, 2014, vol. 114, No. 253, pp. 13-18 (6 pages total).

International Search Report for PCT/JP2018/001727 dated Apr. 24, 2018 (PCT/ISA/210).

Written Opinion for PCT/JP2018/001727 dated Apr. 24, 2018 (PCT/ISA/237).

* cited by examiner

Fig. 9

900 — CONFIGURATION INFORMATION DATABASE

4003a

| PRODUCT NAME 901 | COMPONENT PART GROUP 902 |
|---|---|
| IMAGE PROCESSING CAMERA 1001 | Linux Kernel 3.4<br>OpenCV 1.1<br>glibc 2.2<br>... |
| IMAGE PROCESSING CAMERA 1002 | Linux Kernel 2.6<br>OpenCV 2.0<br>glibc 2.2<br>... |
| VOICE NAVIGATION SYSTEM 2001 | Android 4.4<br>openssl 0.9.7<br>... |
| REMOTE SECURITY ECU 3001 | Linux Kernel 4.2<br>CAN X-Chip<br>... |
| ... | ... |

SECURITY INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2018/001727 filed Jan. 22, 2018, the disclosure of which is incorporated herein in its entirety by reference.

TECHNICAL FIELD

The present invention relates to a technology of collecting information about security of a product.

BACKGROUND ART

Attacks related to security (such as cyber attacks) targeting not only information processing systems but also other systems (such as control systems) are occurring.

In relation to a technology of evaluating a risk related to a product, for example, PTL 1 describes a technology of calculating a procurement risk at a time of purchase of a part from an end supplier by referring to a past order history.

PTL 2 describes a technology of preparing supply chain models respectively supporting a steady state and occurrence of a risk event, and when determining occurrence of a risk event, based on actual data from a supply chain, deriving a supply chain system minimizing a risk loss by use of the risk-responsive supply chain model.

PTL 3 describes a technology of calculating a score for determining whether a web page contains illegal or harmful information, by use of information characteristic of a server providing a web page containing illegal or harmful information.

CITATION LIST

Patent Literature

PTL 1: Japanese Unexamined Patent Application Publication No. 2013-196403
PTL 2: Japanese Unexamined Patent Application Publication No. 2011-227852
PTL 3: Japanese Unexamined Patent Application Publication No. 2011-248500

SUMMARY OF INVENTION

Technical Problem

When evaluating a security risk related to a product (such as a control system), it is not necessarily easy to collect and examine information about unknown and known vulnerabilities that may be included in components (such as a subsystem, various devices, and hardware and software parts) constituting the product.

Both of the technologies described in aforementioned PTLs 1 and 2 are technologies of evaluating a risk arising in a supply chain of a product. The technology described in aforementioned PTL 3 is a technology of determining whether a web page contains harmful information. In other words, the technologies are not technologies suitable for evaluation of a risk related to product security.

A technology according to the present disclosure has been developed in view of the circumstances as described above. Specifically, an object of the present disclosure is to provide a technology enabling efficient examination of a security threat that may affect a product.

Solution to Problem

In order to achieve the aforementioned object, a security information processing device according to an aspect of the present disclosure has the following configuration. Specifically, the security information processing device according to the aspect of the present disclosure includes: a threat information model generation unit generating, by use of first threat information including threat information indicating a threat related to security, a threat information model capable of classifying a piece of information as the threat information; a collection unit collecting one or more threat information candidates each being a candidate for the threat information, from an information source providing information related to security; and a detection unit detecting, by use of information about a component constituting a product and the threat information model, second threat information including the threat information that may affect the product, from the collected one or more threat information candidates.

An information processing method according to another aspect of the present disclosure has the following configuration. Specifically, the security information processing method according to the aspect of the present disclosure includes, by an information processing device: generating, by use of first threat information including threat information indicating a threat related to security, a threat information model capable of classifying a piece of information as the threat information; collecting one or more threat information candidates each being a candidate for the threat information, from an information source providing information related to security; and detecting, by use of information about a component constituting a product and the threat information model, second threat information including the threat information that may affect the product, from the collected one or more threat information candidates.

The aforementioned object is also achieved by a computer program providing, with a computer, the security information processing device, the information processing method, and/or the like having the aforementioned configurations, a computer-readable recording medium having the computer program stored thereon, and the like.

A security information processing program according to another aspect of the present disclosure has the following configuration. Specifically, the security information processing program according to the aspect of the present disclosure causes a computer to execute: processing of generating, by use of first threat information including threat information indicating a threat related to security, a threat information model capable of classifying a piece of information as the threat information; processing of collecting one or more threat information candidates each being a candidate for the threat information, from an information source providing information related to security; and processing of detecting, by use of information about a component constituting a product and the threat information model, second threat information including the threat information that may affect the product, from the collected one or more threat information candidates. A recording medium according to an aspect of the present disclosure may have the aforementioned computer program recorded thereon.

Advantageous Effects of Invention

The present disclosure enables efficient examination of a security threat that may affect a product.

BRIEF DESCRIPTION OF DRAWINGS

FIG. 9 is a diagram illustrating a specific example of a configuration information database.

EXAMPLE EMBODIMENT

Figure 1:
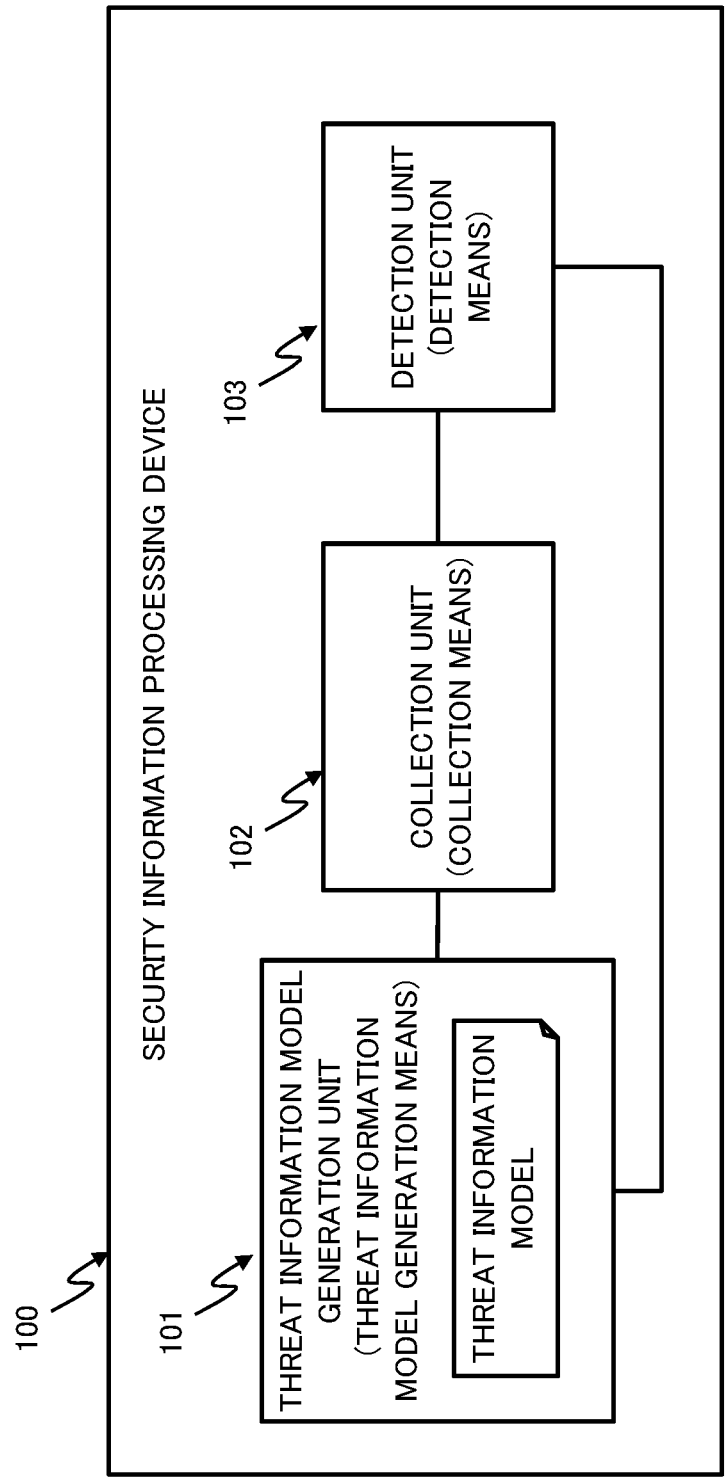
FIG. 1 is a block diagram illustrating a functional configuration of a security information processing device according to a first example embodiment of the present disclosure.

Prior to detailed description of each example embodiment, technical considerations and the like related to the present disclosure will be described in detail.

For convenience of description, attacks related to security are hereinafter generically called cyber attacks.

For convenience of description, out of systems including externally controllable components, systems other than information systems mainly configured with information communication devices and the like are hereinafter generically called "control systems." Specifically, "control systems" according to the present disclosure may include, for example, systems (or subsystems constituting such systems) having various infrastructures, various plants, various industrial machines, various transportation systems, various types of transportation equipment, an air conditioner, a robot, and various sensors as control targets, without being limited to a specific field or area. A product including a control system may be hereinafter described as a "control system product" or simply a "product."

While a relatively large number of control systems have been operating off-line without being connected to communication lines, the number of control systems operating in an on-line state being connected to communication lines is increasing with spread of the Internet, general-purpose buses, and the like.

Consequently, for example, occasions of operating systems and applications widely used in information communication equipment being employed as part of control systems are increasing. Consequently, control systems may become targets of vulnerability attacks attacking defects of operating systems and/or applications, similarly to information systems.

Information describing a content related to security threats such as vulnerability attack techniques and damage status (hereinafter described as "threat information") may be disclosed to the general public by a public organization and/or a vendor. In the case of information communication equipment, for example, automatic correction of vulnerabilities by use of a self-updating function is generally executed at present. On the other hand, components constituting a control system may not necessarily have a function such as self-updating. Further, an environment allowing execution of the self-updating function may not be prepared.

With regard to a control system, a product is often configured by combining a plurality of components (such as a hardware part and a software part). Consequently, a range of threat information requiring study with respect to a product (control system) increases in proportion to complexity (such as the number of components) of the product. In addition, threat information requiring study varies by products.

For example, information about security threats (information about unknown threats in particular) often circulates through social media in the Internet. In order to acquire useful information, sites and social media where threat information is searched need to be suitably selected. Since an amount of circulating information is large, threat information may not be precisely retrieved unless, for example, a name of a part related to a control system, or the like is suitably specified as a keyword.

A damage caused when a threat related to a control system product becomes apparent escalates according to a sales figure of the product using a component (a part in the control system) exposed to the threat. Due to such a circumstance, a provider (vendor) of a control system is required to suitably examine and collect information about security threats with respect to components constituting the control system and study a risk.

However, as described above, the number of components of a control system to be examined increases according to complexity of the control system, and therefore it is not easy to grasp known and unknown vulnerabilities that may be included in a control system. It is also not easy to suitably retrieve information about security threats that may affect a control system (and components of the system) from a large amount of vulnerability information.

Under the circumstances described above, the present inventors have arrived at an idea of the technology according to the present disclosure capable of suitably detecting information that may affect components (such as a software part and a hardware part) constituting a control system in circulating information (information about security threats).

For example, based on threat information being information indicating a threat related to security, a security information processing device according to an aspect of the technology according to the present disclosure described below may be configured to generate a threat information model capable of classifying a piece of information as threat information. At this time, the security information processing device may generate a threat information model by use of known threat information disclosed to the general public by a public organization and/or a vendor. For example, the security information processing device may be configured to collect a threat information candidate being a candidate for threat information that may affect a product from a specific information source (such as a website providing threat information or a social network). For example, the security information processing device may be configured to detect a threat information candidate including threat information that may affect a product out of the aforementioned collected threat information candidates by use of a generated threat information model.

The technology according to the present disclosure including the configuration as described above enables efficient examination of a security threat that may affect a product (such as a control system). The reason is that threat information that may affect a product can be detected out of threat information candidates collected from information sources, by use of a threat information model generated by use of known threat information.

The technology according to the present disclosure will be specifically described below by use of specific example embodiments. Configurations of the following specific example embodiments are exemplifications, and the technical scope of the technology according to the present disclosure is not limited to the configurations. Allocation (such as function-based allocation) of components constituting each of the following example embodiments is an example capable of providing the example embodiment. The configurations capable of providing the example embodiments are not limited to the following exemplifications, and various configurations may be assumed. A component constituting the following example embodiments may be further divided, or one or more components constituting the following example embodiments may be integrated.

When the example embodiments exemplified below are provided by use of one or more physical devices, virtual devices, and a combination thereof, one or more components may be provided by one or more devices, and one component may be provided by use of a plurality of devices. A specific example of a hardware configuration of a device capable of providing each example embodiment will be described later.

First Example Embodiment

A first example embodiment being a basic example embodiment of the technology according to the present disclosure will be described below.

Configuration

FIG. 1 is a block diagram illustrating a functional configuration of a security information processing device 100 according to the present example embodiment.

As illustrated in FIG. 1, the security information processing device 100 includes a threat information model generation unit 101 (threat information model generation means), a collection unit 102 (collection means), and a detection unit 103 (detection means). The components constituting the security information processing device 100 may be communicably connected to one another by use of a suitable method. The security information processing device 100 may be implemented by use of a dedicated hardware device or may be implemented by use of a general-purpose hardware device and a software program. The hardware device constituting the security information processing device 100 may be a physical device or may be a virtual hardware device (such as a virtual machine) constructed by use of a suitable virtualized infrastructure.

When the security information processing device 100 is implemented by use of a physical hardware device, components included in the security information processing device 100 may be provided by use of, for example, suitable circuit devices (such as a communication device, an arithmetic device, and a storage device). When the security information processing device 100 is implemented by use of a general-purpose hardware device and a software program, components included in the security information processing device 100 may be provided as, for example, suitable software modules.

Each component of the security information processing device 100 will be described below.

The threat information model generation unit 101 is configured to generate a threat information model capable of classifying a piece of information as threat information indicating a threat related to security, based on first threat information including threat information.

For example, first threat information may be known threat information disclosed by a public organization, a security vendor, and/or a security researcher. Specifically, first threat information is information determined to include information indicating some security threat (in other words, information known to include information indicating a security threat). For example, the information is appropriately available through the Internet.

According to the present example embodiment, previously collected first threat information may be provided for the security information processing device 100 (the threat information model generation unit 101), or the security information processing device 100 may collect first threat information. First threat information may be stored in an external storage device accessible from the security information processing device 100 or may be stored in the security information processing device 100.

For example, collected first threat information may be document (text) data including information about a security threat. When data such as a voice and/or an image (including a static image and a dynamic image) is collected as first threat information, the security information processing device 100 may generate document data (text data) from the data by use of a suitable method (such as voice recognition and/or image analysis).

For example, the threat information model generation unit 101 generates a threat information model capable of classifying a piece of information as threat information, by use of collected first threat information. Specifically, for example, a threat information model may be a model capable of determining whether a piece of information is classified as threat information (or whether a piece of information is information similar to threat information). For example, a threat information model may be a model capable of calculating a binary value (such as "0" and "1") indicating whether a piece of information is threat information when the information is input, a model capable of calculating a probability, a model capable of calculating a score, or a model capable of calculating reliability.

A specific model representation providing a threat information model is not particularly limited. As an example, the threat information model generation unit 101 may provide a threat information model by use of a logistic regression model. Further, for example, the threat information model generation unit 101 may provide a threat information model by use of a classifier (discriminator) generally available in the field of pattern recognition.

The threat information model generation unit 101 may convert collected first threat information into feature value data in a suitable format and learn a threat information model by use of the feature value data. When first threat information is document data (text data), the threat information model generation unit 101 may convert the document data into a document vector by use of a suitable method and use the document vector as feature value data.

For example, the threat information model generation unit 101 may store a generated threat information model or may appropriately provide the model for the detection unit 103.

The collection unit 102 is configured to collect a threat information candidate being a candidate for threat information from a specific information source. Specifically, for example, the collection unit 102 may use various sites where threat information circulates, a social network, and various databases, as specific information sources. For example, setting information for specifying an information source may be preset to the security information processing device 100 or may be appropriately set by a user of the security information processing device 100. A threat information candidate collected from each information source is such threat information that whether the threat information affects security of a product is unknown (unconfirmed). For example, a threat information candidate may include information about a known vulnerability or may include information about an unknown vulnerability.

For example, the collection unit 102 may be configured to collect information related to a component constituting a product (such as a control system) as a threat information candidate. In this case, for example, the information about the component (such as a software part or a hardware part) constituting the product (such as a control system) may be previously given to the security information processing device 100 in a database format. When search processing (such as a keyword search) can be executed at each information source, for example, the collection unit 102 may make a search with a component constituting a product as a keyword and collect the search result as a threat information candidate. For example, the collection unit 102 may acquire information sent by each information source on an as-is basis. In this case, for example, the collection unit 102 may select, as a threat information candidate, information related to a component constituting the product (such as information including a name of a component constituting the product) in information acquired from the information source.

The detection unit 103 is configured to select second threat information including threat information that may affect a product from threat information candidates collected by the collection unit 102, by use of information about a component constituting the product and a threat information model.

For example, by use of a threat information model generated by the threat information model generation unit 101, the detection unit 103 determines whether a threat information candidate collected by the collection unit 102 is classified (determined) as threat information related to a security threat. Specifically, for example, when a threat information candidate is document data, the detection unit 103 generates feature value data (a document vector) from the document data. For example, the detection unit 103 may generate feature value data by use of a method being the same as the method of generating feature value data from first threat information by the threat information model generation unit 101. For example, the detection unit 103 may determine whether a threat information candidate is threat information (second threat information) that may affect a product, from an output acquired by inputting feature value data generated from the threat information candidate to a threat information model.

As a specific example, it is assumed that a threat information model is a model outputting a probability value. For example, when a probability value acquired upon input of a piece of feature value data is equal to or more than a specific threshold value, the detection unit 103 may determine that the threat information candidate being a source for generating the feature value data is threat information (second threat information) that may affect a product. Consequently, the detection unit 103 can detect threat information that may affect a product (more specifically, a component of the product) out of threat information candidates collected by the collection unit 102.

Operation

An operation of the security information processing device 100 configured as described above will be described below with reference to FIG. 2 and FIG. 3.

Figure 2:
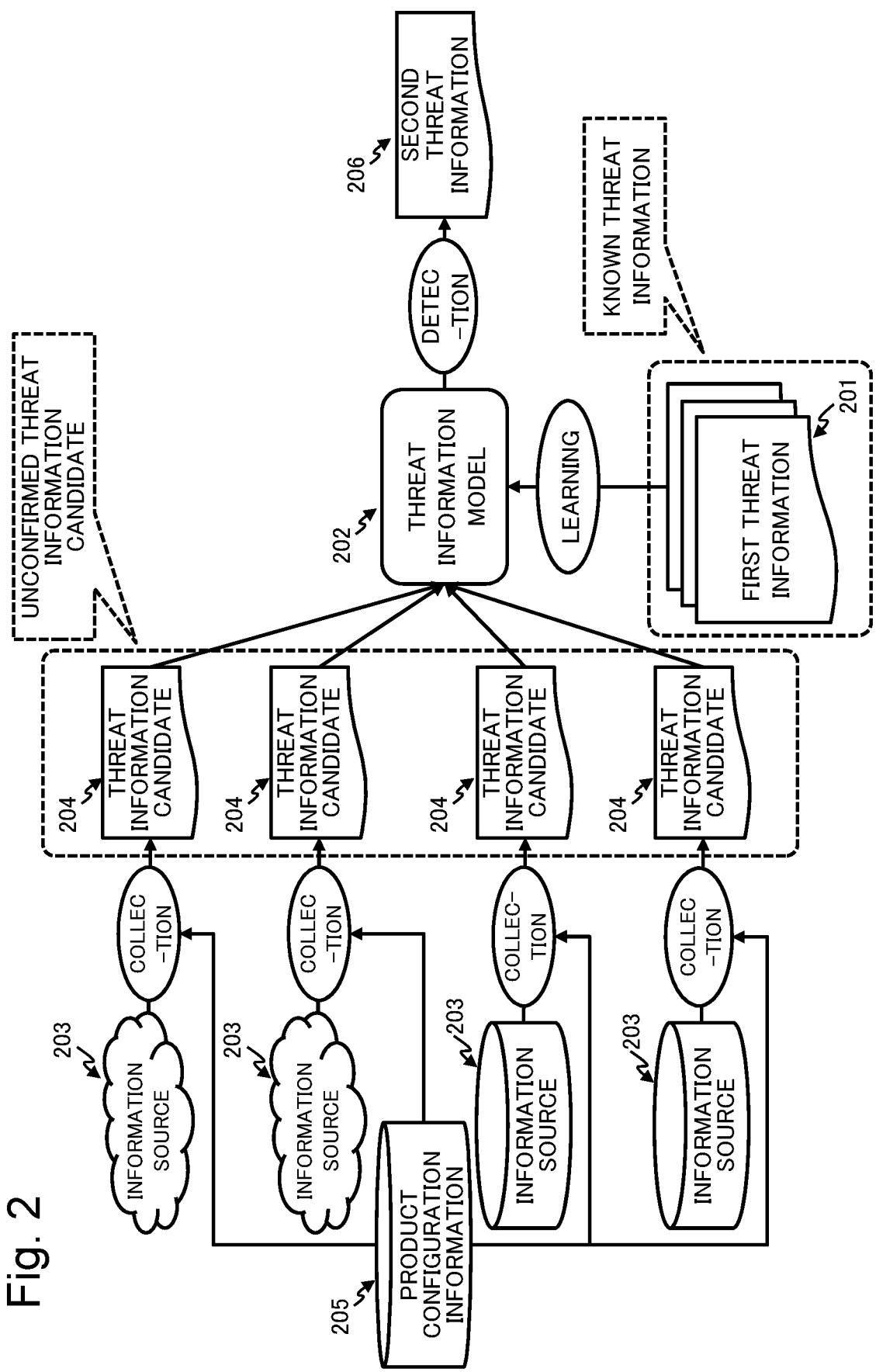
FIG. 2 is a diagram conceptually illustrating processing in the security information processing device according to the first example embodiment of the present disclosure.
Figure 3:
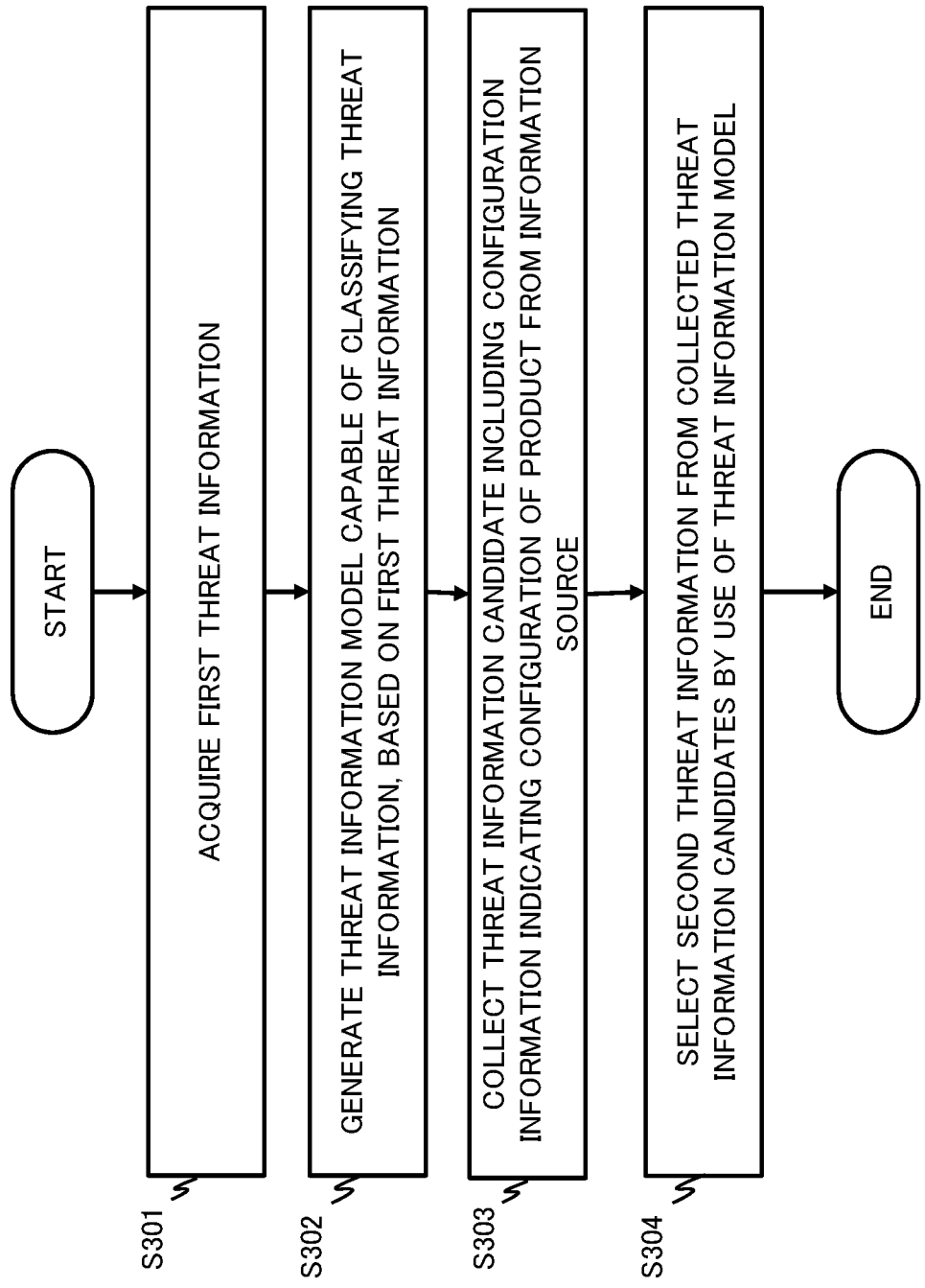
FIG. 3 is a flowchart illustrating an example of an operation of the security information processing device according to the first example embodiment of the present disclosure.

FIG. 2 is a diagram conceptually illustrating various types of processing executed in the security information processing device 100. FIG. 2 illustrates a specific example for description, and the present example embodiment is not limited to the specific example illustrated in FIG. 2.

The security information processing device 100 (the threat information model generation unit 101) generates a threat information model (202 in FIG. 2) by use of first threat information (201 in FIG. 2). As described above, the first threat information may be previously collected known threat information.

The security information processing device 100 (the collection unit 102) collects threat information candidates (204 in FIG. 2) from various information sources (203 in FIG. 2). At this time, the security information processing device 100 may collect information about a component constituting a product as a threat information candidate. For example, information about a component constituting a product may be provided as a database (205 in FIG. 2).

By use of the generated threat information model 202, the security information processing device 100 (the detection unit 103) selects, as second threat information (206 in FIG. 2), a threat information candidate 204 including a security threat to the product (specifically, a component of the product) out of the threat information candidates 204. Consequently, the detection unit 103 can detect threat information including a security threat to the product (specifically, a component of the product).

The operation of the security information processing device 100 according to the present example embodiment will be described below with reference to a flowchart illustrated in FIG. 3.

The security information processing device 100 (the threat information model generation unit 101) acquires first threat information including threat information indicating a threat related to security (Step S301). As described above, first threat information may be previously collected and be provided for the security information processing device 100.

By use of the acquired first threat information, the security information processing device 100 (the threat information model generation unit 101) generates a threat information model capable of classifying threat information (Step S302). Specifically, the security information processing device 100 may generate feature value data from the first threat information and by use of the feature value data, may learn a threat information model capable of determining whether a piece of information is classified (determined) as threat information.

The security information processing device 100 (the collection unit 102) collects a threat information candidate being a candidate for threat information, from an information source providing information related to security (Step S303). For example, an information source may be a site circulating vulnerability information or a social network.

By use of information about a component constituting a product and the generated threat information model, the security information processing device 100 (the detection unit 103) selects second threat information including threat information that may affect the product from the threat information candidates (Step S304).

Specifically, for example, the security information processing device 100 may generate feature value data from a collected threat information candidate and, based on an output acquired by inputting the feature value data to the threat information model, may determine whether the threat information candidate being a source of the feature value data is classified as threat information (second threat information) that may affect the product.

The security information processing device 100 according to the present example embodiment configured as described above enables efficient examination of a security threat that may affect a system. The reason is that threat information that may affect a product can be selected out of threat information candidates collected from information sources, by use of a threat information model generated by use of known threat information. In other words, by using a threat information model generated by use of known threat information that can be acquired relatively easily, useful information can be selected from unconfirmed threat information candidates. The collection unit 102 may collect a relatively large number of threat information candidates according to the number of information sources and an amount of information provided by each information source, and useful information and non-useful information coexist in the collected information. For example, it is not easy to manually detect useful information (information about a security threat) related to a product from such information. On the other hand, for example, by classifying collected threat information candidates (determining whether a candidate is threat information) by use of a threat information model, the security information processing device 100 according to the present example embodiment can efficiently detect useful information (second threat information) from the threat information candidates.

Second Example Embodiment

A second example embodiment of the technology according to the present disclosure will be described below. For example, a security information processing device 4000 according to the second example embodiment (to be described later) may be provided as a device extending the function of the security information processing device 100 according to the first example embodiment.

Configuration

The security information processing device 4000 according to the present example embodiment can operate in coordination with a product management system managing a life cycle of a product [such as a products lifecycle management (PLM) system] and is configured to detect information indicating a security threat that may affect a product (such as a control system) managed by the product management system.

Figure 4:
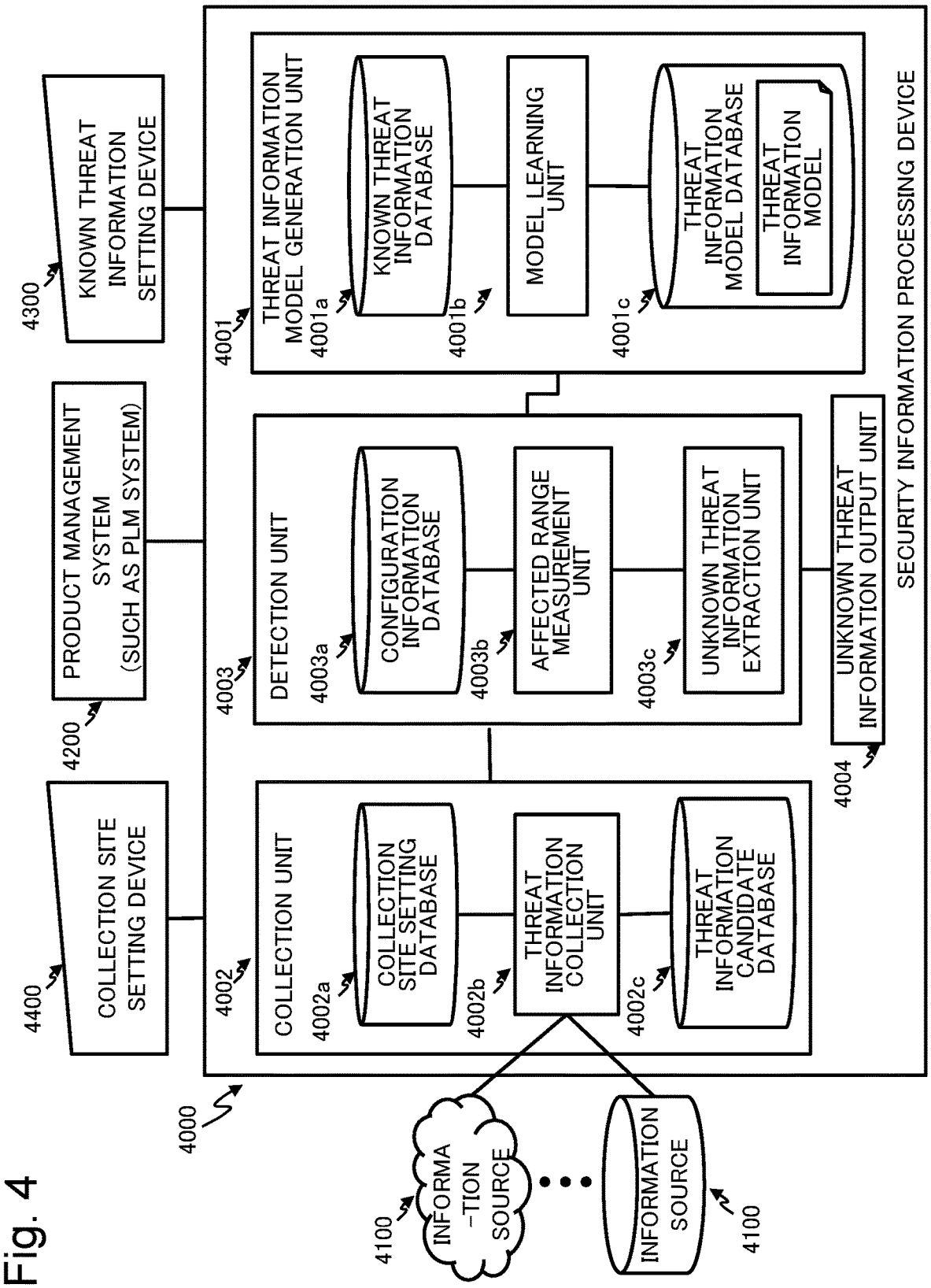
FIG. 4 is a block diagram illustrating a functional configuration of a security information processing device according to a second example embodiment of the present disclosure.

FIG. 4 is a block diagram illustrating a functional configuration of the security information processing device 4000 according to the present example embodiment and an environment in which the security information processing device 4000 is deployed.

As illustrated in FIG. 4, the security information processing device 4000 is communicably connected to an information source 4100 (to be described later) and a product management system 4200 (to be described later) by use of a suitable communication method. The security information processing device 4000 may also be communicably connected to a known threat information setting device 4300 (to be described later) and a collection site setting device 4400 (to be described later) by use of a suitable communication method.

The information sources 4100 may be various sites where various types of information related to security (including threat information) circulate, a social network, various databases, and the like, similarly to the aforementioned first example embodiment. For example, the security information processing device 4000 may acquire threat information (more specifically, a threat information candidate) from an information source 4100 through a communication network such as the Internet.

For example, the product management system 4200 is an information system capable of managing a life cycle of a product, and, for example, may be provided by use of various servers and databases. It is assumed in the present example embodiment that, as a specific example, the product management system 4200 is provided by a PLM system being a system centrally managing a life cycle of a product (such as control system) handled in a manufacturing industry.

Information managed by the product management system 4200 about a product is not particularly limited. For example, the product management system 4200 may manage various data related to a product in a suitable format such as a database. For example, the product management system 4200 may hold data (a parts list) related to components (component parts) constituting a product in a database.

For example, the product management system 4200 may hold design data [such as computer-aided design (CAD) data, circuit design data, and program design data) related to a product in a database. For example, the product management system 4200 may hold delivery destination and/or sales information (such as a sales volume and a sales amount) of a product in a database.

The product management system 4200 is configured to appropriately provide managed data in response to a request. At this time, the product management system 4200 may provide access to a database managing the data.

The known threat information setting device 4300 is a device providing known threat information, as first threat information, for a threat information model generation unit 4001 to be described later.

For example, the known threat information setting device 4300 may acquire known threat information from a file on a local file system or files provided by various hosts on a communication network. The known threat information setting device 4300 may receive input of known threat information through an input-output device (such as a keyboard, a mouse, or a display) or the like connected to the known threat information setting device 4300. In this case, for example, the known threat information setting device 4300 may present a screen for receiving a uniform resource locator (URL) of an information source, a title, and a body as an input screen and receive a content input to the input screen. For example, the known threat information setting device 4300 may acquire known threat information disclosed by a public organization, a security vendor, or a security researcher through a communication line such as the Internet. The known threat information setting device 4300 may execute processing of acquiring known threat information at a specific timing or periodically.

First threat information provided by the known threat information setting device 4300 may be document (text) data including information about a security threat. When data such as a voice and/or an image (including a static image and a dynamic image) are collected as known threat information, the known threat information setting device 4300 may generate document data (text data) from the data by use of a suitable method (such as voice recognition or image analysis) and provide the document data for the threat information model generation unit 4001 as first threat information.

For example, the known threat information setting device 4300 provides acquired known threat information for the threat information model generation unit 4001 as first threat information. For example, the first threat information provided for the threat information model generation unit 4001 by the known threat information setting device 4300 may include a URL of an information source from which the information is acquired and a content (such as a title and a body).

The collection site setting device 4400 is a device setting, to a collection unit 4002 to be described later, information allowing specification of an information source 4100 from which a threat information candidate is collected. For example, the collection site setting device 4400 may acquire information allowing specification of an information source 4100 from a file on a local file system, files provided by various hosts on a communication network, and/or an input through an input device connected to the collection site setting device 4400. For example, the collection site setting device 4400 may provide the collection unit 4002 with a URL of an information source 4100 and data indicating a depth of search at a time of acquisition of information at the information source 4100, as information allowing specification of the information source 4100.

A specific configuration of the security information processing device 4000 will be described below. The security information processing device 4000 includes the threat information model generation unit 4001, the collection unit 4002, and a detection unit 4003. The security information processing device 4000 may also include an unknown threat information output unit 4004. The components constituting the security information processing device 4000 may be communicably connected to one another by use of a suitable communication method. The components constituting the security information processing device 4000 will be described below.

Threat Information Model Generation Unit

The threat information model generation unit 4001 (threat information model generation means) is configured to generate a threat information model capable of classifying a piece of information as threat information, based on first threat information including threat information indicating a threat related to security, similarly to the threat information model generation unit 101 according to the first example embodiment. The threat information model generation unit 4001 may have a configuration capable of extending the function of the threat information model generation unit 101.

Specifically, as illustrated in FIG. 4, the threat information model generation unit 4001 may include a known threat information database 4001a, a model learning unit 4001b, and a threat information model database 4001c.

Figure 5:
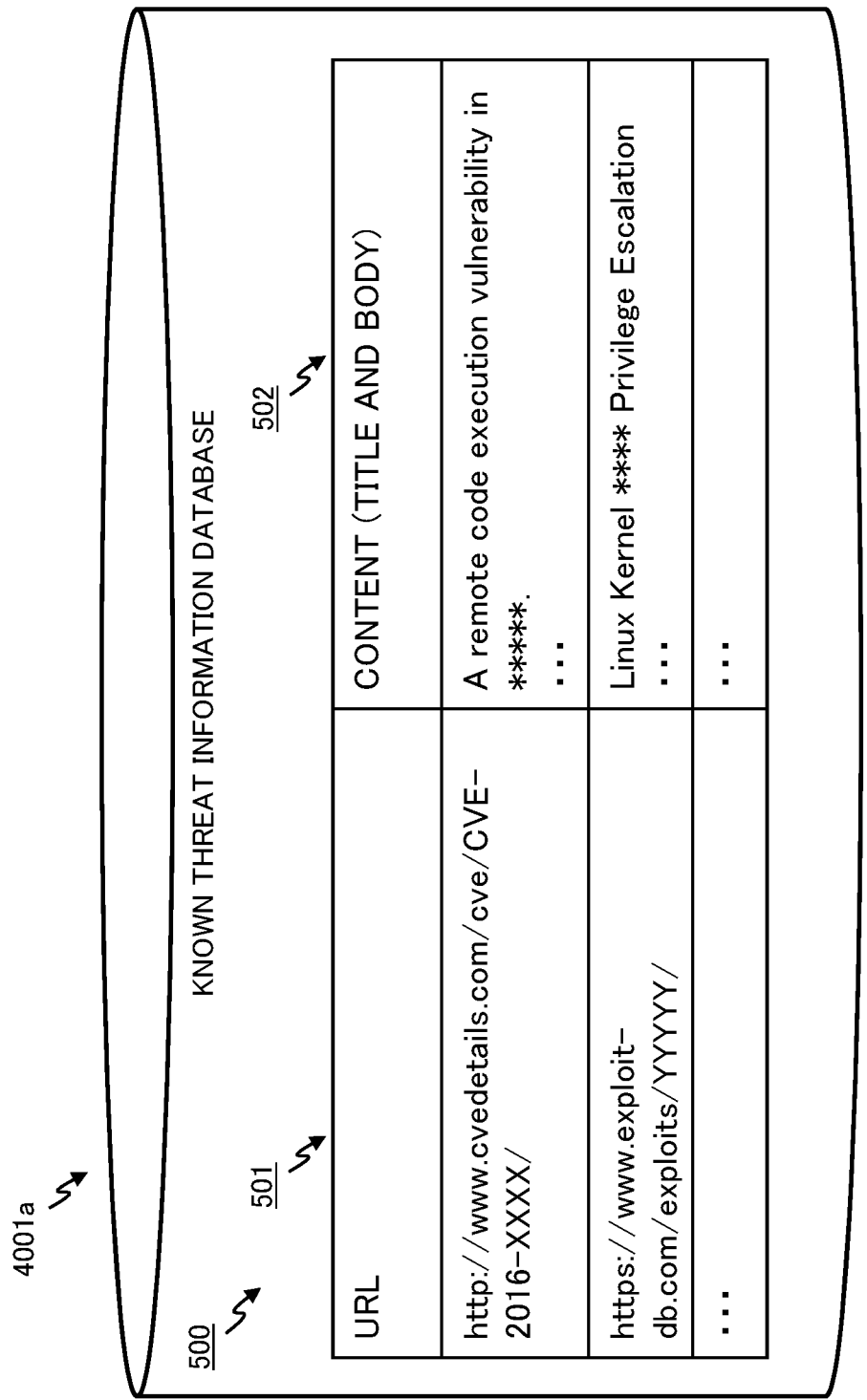
FIG. 5 is a diagram illustrating a specific example of a known threat information database.

The known threat information database 4001a stores first threat information provided by the known threat information setting device 4300. FIG. 5 is a diagram illustrating a specific example of the known threat information database 4001a. As illustrated in FIG. 5, the known threat information database 4001a stores a threat information table 500 recording first threat information as a record. For example, a URL (501 in FIG. 5) allowing specification of an information source providing a piece of threat information and a content (502 in FIG. 5) including the threat information are registered as first threat information in the threat information table 500. For example, a content 502 may be document data of a title and a body of a resource specified by a URL 501. At this time, the document data may be stored as text data. Information included in first threat information is not particularly limited, and document data indicating information related to a security threat have only to be included. In other words, first threat information may include information other than a URL and a content. Further, first threat information may not include a URL. Without being limited to the specific example illustrated in FIG. 5, the known threat information database 4001a may store first threat information with a suitable data structure other than a table.

The known threat information database 4001a may provide the detection unit 4003 (specifically, an affected range measurement unit 4003b) to be described later with data registered in the threat information table 500 [such as data registered in a content (502 in FIG. 5)].

The model learning unit 4001b generates a threat information model capable of classifying threat information, by use of first threat information stored in the known threat information database 4001a. Specifically, for example, the threat information model may be a model capable of determining whether a piece of information is classified as threat information (or whether a piece of information is information similar to threat information).

As a specific example, the model learning unit 4001b according to the present example embodiment generates a document vector from a content (document data of a title and a body) included in first threat information stored in the known threat information database 4001a and learns a threat information model by using the document vector as a feature value. A content included in first threat information may be hereinafter simply described as "document data."

A method of generating a document vector from document data by the model learning unit 4001b is not particularly limited, and various methods capable of representing document data as a numerical value may be employed.

As an example, by, for example, focusing on words included in document data, the model learning unit 4001b may use bag of words (BoW) as a method of vectorizing document data. BoW is a vector representation in which every word appearing in a set of one or more pieces of document data is counted and an appearance frequency of each word is arranged as a vector element. The number of dimensions of BoW increases with the number of words included in the original document data. Accordingly, the model learning unit 4001b according to the present example embodiment may generate a lower dimensional document vector by use of a technology used in topic modeling.

Topic modeling is a technology capable of generating a weight vector of words included in document data from appearance frequencies of the words, and the like, classifying a category in which the document is included, and extracting a topic related to the document. For example, use of topic modeling allows determination of whether a piece of document data is classified as a threat information category.

Various methods can be employed as a means for achieving topic modeling. Specifically, for example, the model learning unit 4001b may convert document data of first threat information into a document vector by use of a document vectorization technique used in latent semantic analysis (LSA), latent semantic indexing (LSI), latent Dirichlet allocation (LDA), or doc2vec.

For example, when using latent semantic analysis (LSA), the model learning unit 4001b can generate a document vector from document data of first threat information by executing processing as described below. Specifically, for example, the model learning unit 4001b converts one or more pieces of document data of first threat information included in the known threat information database 4001a into a bag-of-words (BoW) matrix representation (document matrix). BoW is a vector representation in which every word appearing in a piece of document data is counted and an appearance frequency of each word is arranged as a vector element. In this case, for example, the model learning unit 4001b may generate a document matrix in such a way that each column of the document matrix relates to one piece of document data (document data of first threat information), and each row relates to a word type included in the document. The model learning unit 4001b applies singular value decomposition (SVD) to such document matrix and constructs an approximate matrix by use of only a specific number (such as k) of singular values in descending order. The model learning unit 4001b may employ a column vector of the thus generated approximate matrix as a document vector representing a feature of the document data. The model learning unit 4001b may generate a document matrix in such a way that each row of the document matrix relates to document data, and each column relates to a word type. In this case, a row vector of the approximate matrix may be employed as a document vector representing the document data.

When using LDA, for example, the model learning unit 4001b can generate a document vector from document data of first threat information by executing processing as described below. Specifically, the model learning unit 4001b converts one or more pieces of document data of first threat information included in the known threat information database 4001a into a BoW matrix representation (document matrix). At this time, the model learning unit 4001b may weight each element of the document matrix by calculating a term frequency-inverse document frequency (TF-IDF). Based on the document matrix and a specific number (such as "k") of topics, the model learning unit 4001b estimates a probability distribution related to a selection probability of a topic for a piece of document data and a probability distribution related to a generation probability of a word for each topic. The number of topics ("k") may be previously given, or a suitable value may be selected through a preliminary experiment or the like. When using LDA, the model learning unit 4001b may represent a document as a "k"-dimensional document vector having a weight of each topic as an element. For example, a method described in Reference 1 below is known as a method of analyzing document data by use of LDA.

Reference 1

Tomoharu Iwata, "Topic model: Machine learning professional series," first edition, Kodansha, April, 2015, pp. 55 to 77

When using word2vec, for example, the model learning unit 4001b can generate a document vector from document data of first threat information by executing processing disclosed in Reference 2 or Reference 3 below.

Reference 2

Tomas Mikolov, Kai Chen, Greg Corrado, and Jeffrey Dean, "Efficient Estimation of Word Representations in Vector Space," Proceedings of Workshop at ICLR, 2013

Reference 3

Tomas Mikolov, Ilya Sutskever, Kai Chen, Greg Corrado, and Jeffrey Dean, "Distributed Representations of Words and Phrases and their Compositionality," Proceedings of Advances in Neural Information Processing Systems 26 (NIPS 2013), 2013

The model learning unit 4001b learns a threat information model by use of a feature value (document vector) generated from document data. A threat information model is not limited to a specific model in the present example embodiment, and the model learning unit 4001b may select a suitable model.

As an example, the model learning unit 4001b may use a logistic regression model. As described above, first threat information is information determined to include information indicating some security threat (that is, information known to include information indicating a security threat). Accordingly, the model learning unit 4001b can generate (learn) a logistic regression model capable of estimating a probability that a piece of input data (document data) is threat information, by using a document vector generated from document data of first threat information as learning data.

For example, a logistic regression model is a model capable of, by use of a logistic function, calculating a probability of an output when an input (such as a document vector) is given (a probability that document data relating to the document vector are threat information). For example, the model learning unit 4001b can learn a logistic regression model (specifically, a parameter of a model) by maximum likelihood estimation using learning data. For example, learning of a logistic regression model can be achieved by use of a known technology. The model learning unit 4001b may generate a threat information model by use of a suitable model representation other than a logistic regression model.

The model learning unit 4001b may provide a generated threat information model for the threat information model database 4001c.

The threat information model database 4001c stores a threat information model generated by the model learning unit 4001b. The threat information model database 4001c may store a plurality of threat information models. For example, the threat information model database 4001c may store a threat information model by use of a data structure in a table format or may store a threat information model by use of a suitable data structure in a format other than a table format.

Collection Unit

A specific configuration of the collection unit 4002 will be described below. The collection unit 4002 (collection means) is configured to collect a threat information candidate being a candidate for threat information from a specific information source, similarly to the collection unit 102 according to the first example embodiment. The collection unit 4002 may have a configuration capable of extending the function of the collection unit 102. As illustrated in FIG. 4, the collection unit 4002 may include a collection site setting database 4002a, a threat information collection unit 4002b, and a threat information candidate database 4002c.

Figure 6:
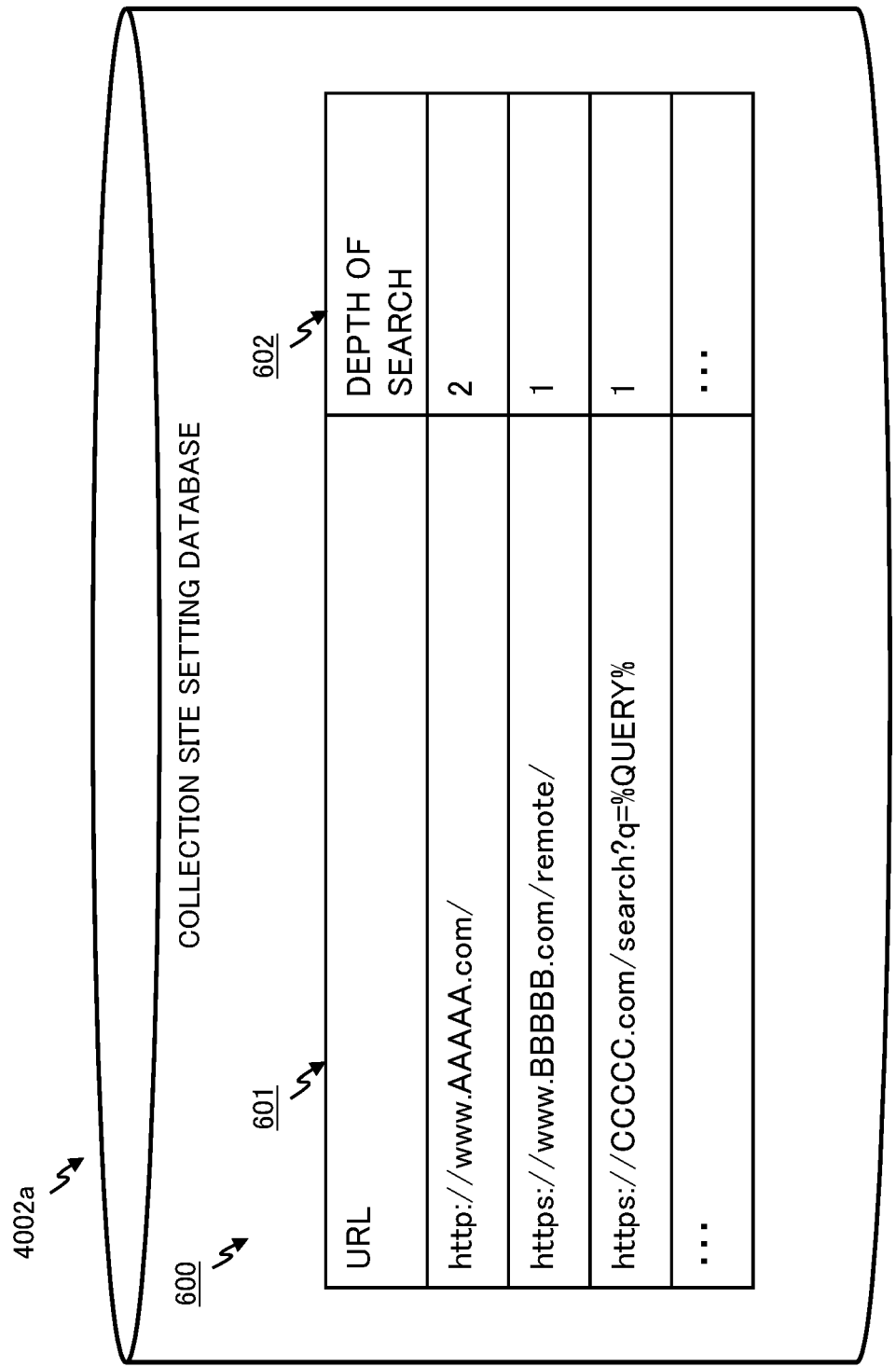
FIG. 6 is a diagram illustrating a specific example of a collection site setting database.

As illustrated in FIG. 6, the collection site setting database 4002a stores data allowing specification of an information source 4100 sending various types of information related to security (including threat information). FIG. 6 is a diagram illustrating a specific example of the collection site setting database 4002a. As illustrated in FIG. 6, the collection site setting database 4002a stores a collection site table 600 recording, as records, information (601 in FIG. 6) allowing specification of an information source 4100 and information indicating a depth of search processing (602 in FIG. 6) executed by the threat information collection unit 4002b (to be described later) at the information source. While a URL is used as information allowing specification of an information source 4100 in the specific example illustrated in FIG. 6, the present example embodiment is not limited to the above, and other information (such as a unique address) allowing specification of an information source 4100 may be used. The collection site setting database 4002a can appropriately provide the threat information collection unit 4002b with information registered in the collection site table 600.

A URL of an information source 4100 recorded in the collection site table 600 may include a query part used when a search (such as a keyword search) is executed at the information source 4100. For example, in the specific example illustrated in FIG. 6, a character string "% QUERY" included in a URL corresponds to a query part. A query part included in a URL is replaced by a wording (such as a keyword) to be retrieved when the threat information collection unit 4002b to be described later executes search processing (such as a keyword search) at an information source 4100. In this case, the threat information collection unit 4002b transmits a URL in which the query part is replaced to the information source 4100.

Without being limited to the specific example illustrated in FIG. 6, data indicating a query part other than a URL may be registered in the collection site table 600. In that case, for example, data in which the query part is replaced [such as a body part in a hypertext transfer protocol (HTTP) communication] may be transmitted to an information source 4100 when the threat information collection unit 4002b to be described later executes search processing (such as a keyword search) at the information source 4100.

A depth of search (602 in FIG. 6) recorded in the collection site table 600 indicates a number of times search processing is repeatedly (or recursively) executed by the threat information collection unit 4002b at an information source 4100 specified by a URL (601 in the diagram).

The threat information collection unit 4002b collects a threat information candidate being a candidate for threat information related to a product from a URL recorded in the collection site table 600 stored in the collection site setting database 4002a. Specifically, the threat information collection unit 4002b refers to a configuration table (to be described later) stored in a configuration information database 4003a to be described later. The configuration table records data indicating components (such as a software part and/or a hardware part) constituting a product, and the like.

The threat information collection unit 4002b selects one or more records recorded in the configuration table. At this time, the threat information collection unit 4002b may select all records recorded in the configuration table or may acquire records in a specific range specified by a user of the security information processing device 4000 or the like. By eliminating duplication of acquired records, the threat information collection unit 4002b acquires data (component part data) indicating component parts being components constituting a product. For example, component part data may indicate information allowing specification of a component (such as a name and/or a model number).

The threat information collection unit 4002b generates a search URL by replacing a query part of a URL (601 in FIG. 6) recorded in the collection site table 600 with component part data. When a plurality of (such as "N" where "N" is a natural number equal to or more than 1) pieces of component part data are acquired, the threat information collection unit 4002b may generate ("N") search URLs relating to the component part data. When a URL recorded in the collection site table 600 does not include a query part, the threat information collection unit 4002b may use the URL on an as-is basis.

The threat information collection unit 4002b acquires a content specified by the generated URL from an information source 4100. The threat information collection unit 4002b also analyzes the acquired content and extracts a link included in the content. The threat information collection unit 4002b repeats processing of acquiring a content from an extracted link according to a depth of search (602 in the diagram) recorded in the collection site table 600. A link is information allowing specification of a location of another content. A link may be represented by use of a URL or may be represented by use of a suitable method other than a URL. The following description uses a specific example. It is assumed in the following specific example that a URL is used as a link.

It is assumed as an example that "1" is set to a depth of search (602) for a URL (601) in the collection site table 600.

In this case, the threat information collection unit 4002*b* acquires a content from the URL (601) (may be hereinafter described as a "first-level URL") set to the collection site table 600.

It is assumed as another example that "2" is set to a depth of search (602) for a URL (601) in the collection site table 600. In this case, the threat information collection unit 4002*b* acquires a content from the first-level URL set to the collection site table 600. By analyzing the content acquired from the first-level URL, the threat information collection unit 4002*b* further extracts a URL (hereinafter described as a "second-level URL") included in the content. When the second-level URL is extracted, the threat information collection unit 4002*b* further acquires a content from the second-level URL.

Figure 7:
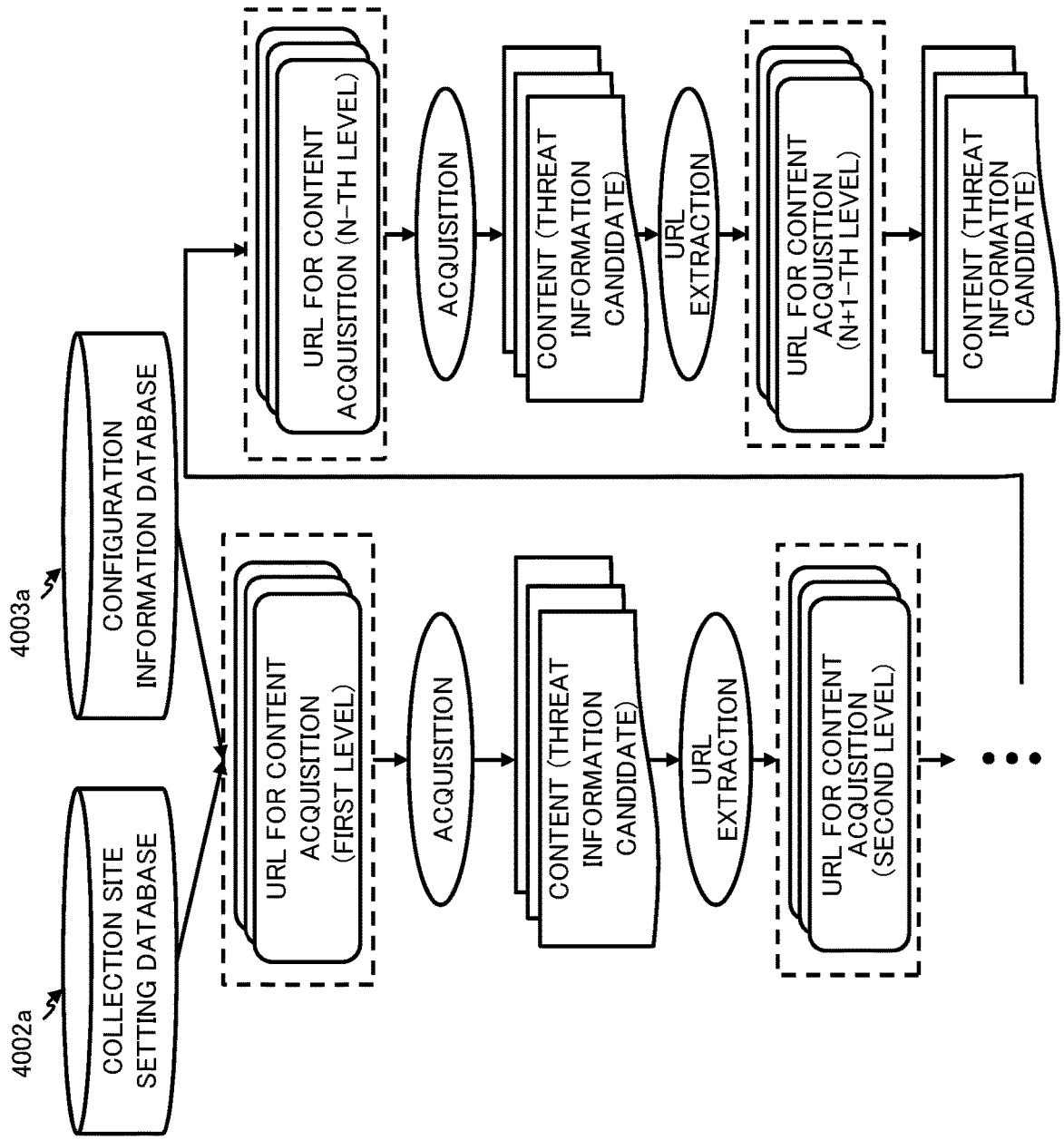
FIG. 7 is a diagram illustrating a process of collecting a candidate for threat information from an information source.

Thus, for example, when "N+1" (where N is a natural number equal to or more than 1) is set to a depth of search (602 in FIG. 6), the threat information collection unit 4002*b* acquires a content from an "N"-th-level URL (where N is a natural number equal to ore more than 1) and extracts a URL ("N+1"-th-level URL) included in the content (see FIG. 7). When the "N+1"-th-level URL is extracted, the threat information collection unit 4002*b* may repeat processing of further acquiring a contents from information sources 4100 specified by URLs. When a plurality of "N+1"-th-level URLs are extracted, for example, the threat information collection unit 4002*b* may acquire a content from part of the extracted "N+1"-th-level URLs according to a setting or the like, or may acquire a content from every URL. For example, such a setting may be registered as a record of the collection site table 600.

The threat information collection unit 4002*b* may store a content acquired as described above into the threat information candidate database 4002*c* to be described later, as a threat information candidate related to a product. Specifically, the threat information collection unit 4002*b* may store a set of a URL of an acquired content and a content body into the threat information candidate database 4002*c* as a threat information candidate. When an acquired content is document data (text data), the threat information collection unit 4002*b* may store the document data into the threat information candidate database 4002*c* on an as-is basis. When an acquired content is data such as voice data and/or image data (including a dynamic image and a static image), the threat information collection unit 4002*b* may convert the content into document data by use of a suitable method (such as voice recognition and/or image recognition) and store the document data into the threat information candidate database 4002*c*.

Figure 8:
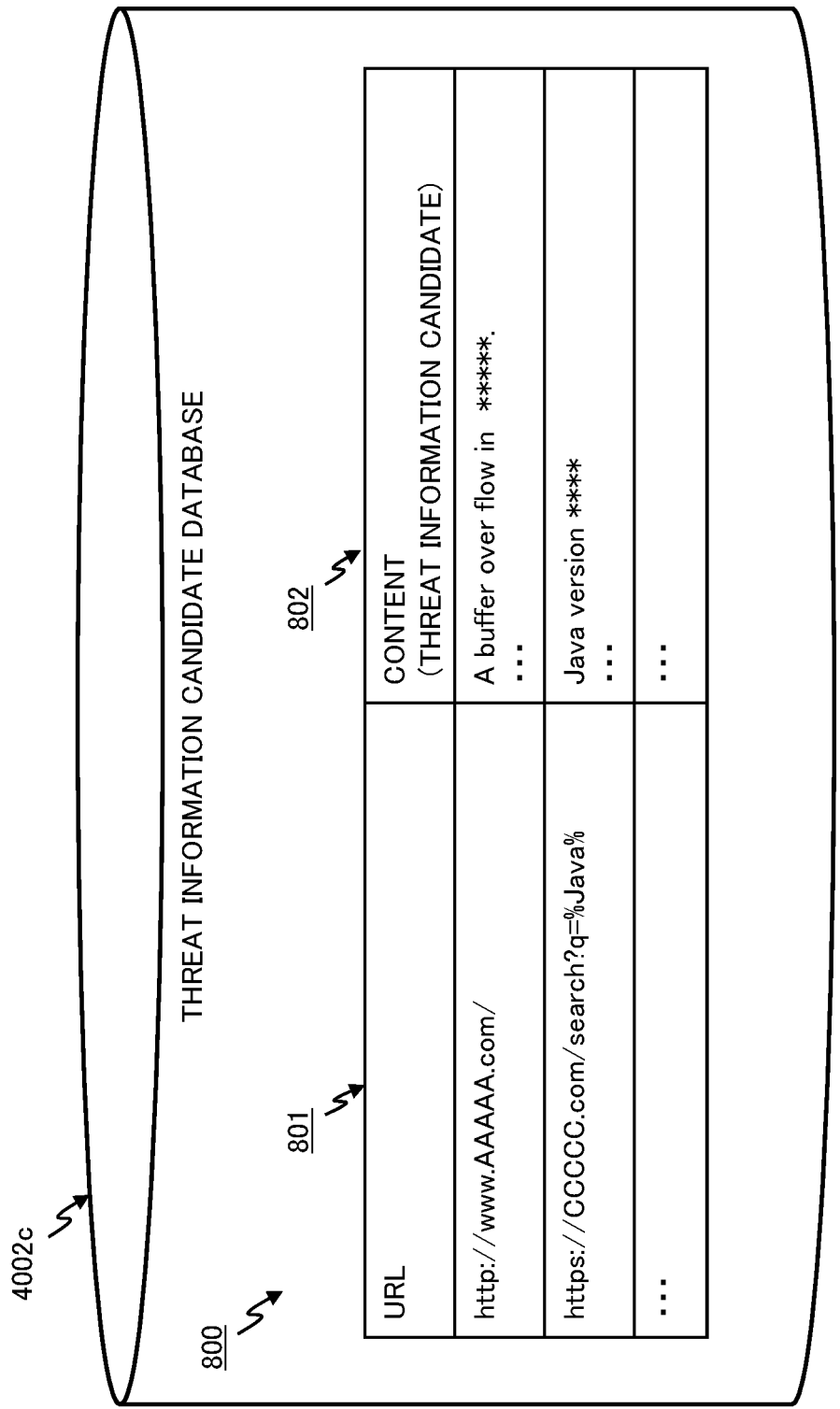
FIG. 8 is a diagram illustrating a specific example of a threat information candidate database.

The threat information candidate database 4002*c* stores a threat information candidate collected by the threat information collection unit 4002*b*. For example, as illustrated in FIG. 8, the threat information candidate database 4002*c* may store a candidate table 800 including, as records, a content (a threat information candidate, 802 in FIG. 8) collected by the threat information collection unit 4002*b* and a URL (801 in FIG. 8) from which the content is collected.

As described above, a candidate for threat information related to a product, the candidate being collected by the threat information collection unit 4002*b*, is registered in the threat information candidate database 4002*c* (candidate table 800). A threat information candidate (802 in FIG. 8) registered in the candidate table 800 is such information that whether the information is threat information related to a product is not confirmed (whether the information includes information indicating a security threat related to a product is unknown). A threat information candidate stored in the threat information candidate database 4002*c* may be hereinafter described as "unknown threat information."

Detection Unit

A specific configuration of the detection unit 4003 will be described below. By use of a threat information model generated in the threat information model generation unit 4001, the detection unit 4003 (detection means) selects threat information (second threat information) including a security threat to a product out of threat information candidates collected by the collection unit 4002. The detection unit 4003 may have a configuration capable of extending the function of the detection unit 103 according to the first example embodiment. As illustrated in FIG. 4, the detection unit 4003 may include the configuration information database 4003*a*, an affected range measurement unit 4003*b*, and an unknown threat information extraction unit 4003*c*.

The configuration information database 4003*a* stores a product managed in the product management system 4200 and information about components of the product. The configuration information database 4003*a* may be hereinafter described as a configuration information storage unit (configuration information storage means). For example, the configuration information database 4003*a* may store a configuration table 900 as illustrated in FIG. 9. A product name (901 in FIG. 9) allowing specification of a product and a component part group (902 in FIG. 9) indicating components constituting the product may be registered as records in the configuration table 900. As described above, the configuration information database 4003*a* may provide the threat information collection unit 4002*b* with information registered in the configuration table 900.

Information allowing specification of a product (such as a name of a product) is registered in a product name (901). Without being limited to a name of a product, other information allowing specification of the product (such as a model number and/or a product code) may be registered as a product name (901 in FIG. 9).

Information allowing specification of components constituting a product (more specifically, component parts used for providing the product) specified by a product name (901 in FIG. 9) is registered in a component part group (902 in FIG. 9). As a specific example, information allowing specification of a hardware part, a software part, a subsystem, and/or the like constituting a product may be registered in a component part group. For example, "Linux Kernel 3.4" (Linux is a registered trademark: hereinafter the same), "OpenCV 1.1," and "glibc 2.2" are registered as parts (software parts) constituting a product name "image processing camera 1001" in the specific example illustrated in FIG. 9. Data registered in a component part group (902 in FIG. 9) may be data indicating a name of a component (part) or other data (such as a model number and/or a product code) allowing specification of the component.

According to the present example embodiment, for example, when information about a product managed in the aforementioned product management system 4200 is updated, the configuration information database 4003*a* may be updated in such a way as to be consistent with the information managed in the product management system 4200. For example, the configuration information database 4003*a* may be deployed in the product management system 4200.

The affected range measurement unit 4003*b* identifies a range of products including a certain component. More specifically, the affected range measurement unit 4003*b* identifies a range of products including a component specifiable by a specific term (such as a specific proper noun). Specific processing by the affected range measurement unit 4003b will be described below.

For example, the affected range measurement unit 4003b may analyze a content (502 in FIG. 5) registered in the aforementioned known threat information database 4001a (threat information table 500) and extract a proper noun indicating a term being characteristic. A method of extracting a proper noun is not particularly limited, and a suitable method (such as named entity extraction using morphological analysis and a dictionary) may be appropriately employed. Consequently, for example, the affected range measurement unit 4003b can extract a term (may be hereinafter described as a "characteristic term") being characteristic and indicating a part characteristic of a product [such as a characteristic component (component part) constituting the product or the like]. As an example, the affected range measurement unit 4003b may extract, for example, "Linux Kernel," "Android," "controller area network (CAN)," and "FlexRay" as characteristic terms (Android is a registered trademark: hereinafter the same).

Without being limited to the above, for example, the affected range measurement unit 4003b may extract a characteristic term from any piece of data registered in a component part group (902 in FIG. 9) in the configuration information database 4003a (configuration table 900).

The affected range measurement unit 4003b identifies a component part group (902 in FIG. 9) including a characteristic term and a product name (901 in FIG. 9) related to the group from an extracted configuration information database 4003a (configuration table 900). Consequently, for example, the affected range measurement unit 4003b can identify a range of products that are affected when a security threat is found in a component (part) indicated by a characteristic term. A component part group identified by the affected range measurement unit 4003b may be hereinafter described as "specific component parts." It is assumed as a specific example that the affected range measurement unit 4003b extracts "Linux Kernel" as a characteristic term. When the configuration information database 4003a stores the configuration table 900 illustrated in FIG. 9, the affected range measurement unit 4003b extracts a component part group including "Linux Kernel" (such as "Linux Kernel 3.4," "Linux Kernel 2.6," and "Linux Kernel 4.2" in FIG. 9) from the configuration table 900 as specific component parts. At this time, the affected range measurement unit 4003b may additionally extract product names including the specific component parts (such as "image processing camera 1001," "image processing camera 1002," and "remote security ECU 3001" in FIG. 9).

The affected range measurement unit 4003b may provide information indicating an extracted specific component part (such as the name of the specific component part) for the unknown threat information extraction unit 4003c to be described later.

The unknown threat information extraction unit 4003c extracts threat information indicating a security threat affecting a product from each threat information candidate stored in the threat information candidate database 4002c. Specific processing by the unknown threat information extraction unit 4003c will be described below.

The unknown threat information extraction unit 4003c acquires each threat information candidate stored in the threat information candidate database 4002c. At this time, for example, the unknown threat information extraction unit 4003c may acquire a content (802 in FIG. 8) registered in each row of the candidate table 800 by use of a threat information model registered in the threat information model database 4001c.

The unknown threat information extraction unit 4003c also acquires a threat information model generated by the threat information model generation unit 4001 from the threat information model database 4001c.

The unknown threat information extraction unit 4003c converts data (document data) of each threat information candidate acquired from the threat information candidate database 4002c into a feature value (document vector) and inputs the feature value to the threat information model. Consequently, the unknown threat information extraction unit 4003c determines whether a threat information candidate is classified as information indicating a security threat. A method of converting document data representing a threat information candidate into a feature value (document vector) is not particularly limited and may be appropriately selected. As an example, a document vector may be generated from document data representing a threat information candidate by use of a method similar to the method of generating a document vector from document data representing first threat information by the model learning unit 4001b.

As an example, when a threat information model is a logistic regression model, by inputting a feature value to the threat information model, the unknown threat information extraction unit 4003c can calculate a value (a probability in this case) allowing determination of whether a threat information candidate being a source of the feature value is threat information related to security. For example, by comparing the calculated value with a threshold value, the unknown threat information extraction unit 4003c may evaluate (determine) whether the threat information candidate being the source of the feature value is threat information related to security. Thus, by use of a threat information model learned by use of known threat information, the unknown threat information extraction unit 4003c can newly extract a threat information candidate similar to a known threat information as threat information.

Out of threat information candidates extracted by use of a threat information model as described above, the unknown threat information extraction unit 4003c selects a threat information candidate including information indicating a specific component part extracted in the affected range measurement unit 4003b as second threat information.

Specifically, for example, when selecting a threat information candidate including information indicating a specific component part, the unknown threat information extraction unit 4003c may select a threat information candidate partially including a character string indicating the specific component part. The unknown threat information extraction unit 4003c may also select a threat information candidate including a character string expression related to the specific component part by suitably interpreting an expression peculiar to a person skilled in the art, the expression being included in a character string indicating the specific component part. It is assumed as a specific example that a character string expression of a specific component part includes a version number of a certain part (such as a part "2.6" in "Linux Kernel 2.6"). In this case, for example, the unknown threat information extraction unit 4003c may select not only a threat information candidate including a character string "Linux Kernel 2.6" but also a threat information candidate including, for example, a character string "Linux Kernel 2.x." A specific processing method of interpreting a peculiar expression included in a character string indicating a specific component part is not particularly limited, and a method available in the field of language processing or pattern recognition may be appropriately employed. As a specific example, the unknown threat information extraction unit 4003c may interpret an expression peculiar to a person skilled in the art, the expression being included in a character string indicating a specific component part, by use of, for example, a regular expression.

Second threat information selected by the unknown threat information extraction unit 4003c includes information about a security threat affecting a product (more specifically, a specific component part being a component of the product). Accordingly, the unknown threat information extraction unit 4003 can select, as second threat information, a threat information candidate including information about a security threat affecting a product [more specifically, a component (component part) of the product], out of threat information candidates stored in the threat information candidate database 4002c.

The unknown threat information extraction unit 4003c may provide selected second threat information for the unknown threat information output unit 4004 (to be described later). At this time, the unknown threat information extraction unit 4003c may provide the unknown threat information output unit 4004 with information indicating the specific component part and information indicating a product including the specific component part.

Unknown Threat Information Output Unit

The unknown threat information output unit 4004 (unknown threat information output means) is configured to output second threat information selected by the detection unit 4003. The unknown threat information output unit 4004 may output information indicating a specific component part and information indicating a product including the specific component part, along with second threat information.

A target (output destination) to which the unknown threat information output unit 4004 outputs various types of information is not particularly limited and may be appropriately selected. As an example, the unknown threat information output unit 4004 may output the aforementioned various types of information to, for example, a display device displaying a user interface capable of displaying information to a user of the security information processing device 4000. For example, the unknown threat information output unit 4004 may control the display device in such a way that a row relating to second threat information in the candidate table 800 in the threat information candidate database 4002c is displayed. For example, the unknown threat information output unit 4004 may control the display device in such a way that a row relating to a specific component part included in second threat information and a product including the specific component part in the configuration table 900 in the configuration information database 4003a is displayed. A specific configuration of the display device is not particularly limited, and a device including one or more of various display devices (such as a liquid crystal panel) may be appropriately selected.

As another example, the unknown threat information output unit 4004 may, for example, output the aforementioned various types of information to a file in a file system, transmit the information to another system through a communication network, or output the information as a printed matter through a printing device.

By confirming an output of the unknown threat information output unit 4004, a user of the security information processing device 4000 can confirm information indicating a security threat related to a product.

Operation

An operation of the security information processing device 4000 configured as described above will be described with reference to a flowchart illustrated in FIG. 10.

The security information processing device 4000 (specifically, the threat information model generation unit 4001) acquires known threat information collected from various information sources and the like (Step S1001). At this time, for example, the threat information model generation unit 4001 may store known threat information collected by the known threat information setting device 4300 into the known threat information database 4001a as first threat information, as described above.

Figure 11:
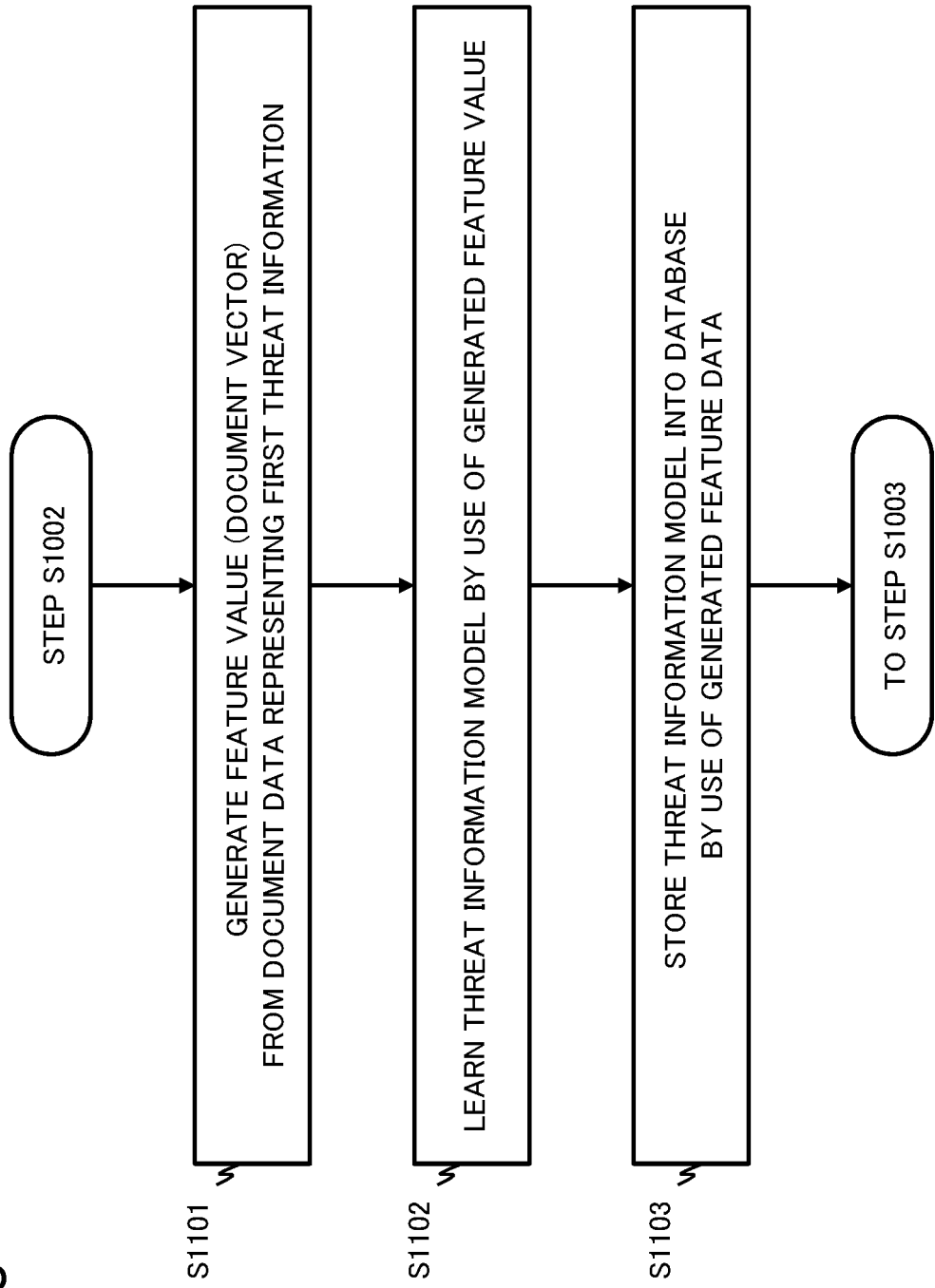
FIG. 11 is a flowchart (part 2) illustrating the example of the operation of the security information processing device according to the second example embodiment of the present disclosure.

Based on the acquired first threat information, the security information processing device 4000 (specifically, the model learning unit 4001b) generates a threat information model capable of classifying threat information (Step S1002). The processing in Step S1002 will be described below with reference to a flowchart illustrated in FIG. 11.

As described above, for example, the model learning unit 4001b generates a feature value (document vector) from document data representing known threat information stored in the known threat information database 4001a (Step S1101). A generation method of a document vector is not particularly limited, and, for example, a topic modeling technique may be employed.

The model learning unit 4001b learns a threat information model by use of the generated feature value (document vector) (Step S1102) and stores the learned threat information model into the threat information model database 4001c (Step S1103). As described above, a logistic regression model may be employed as a threat information model.

Figure 10:
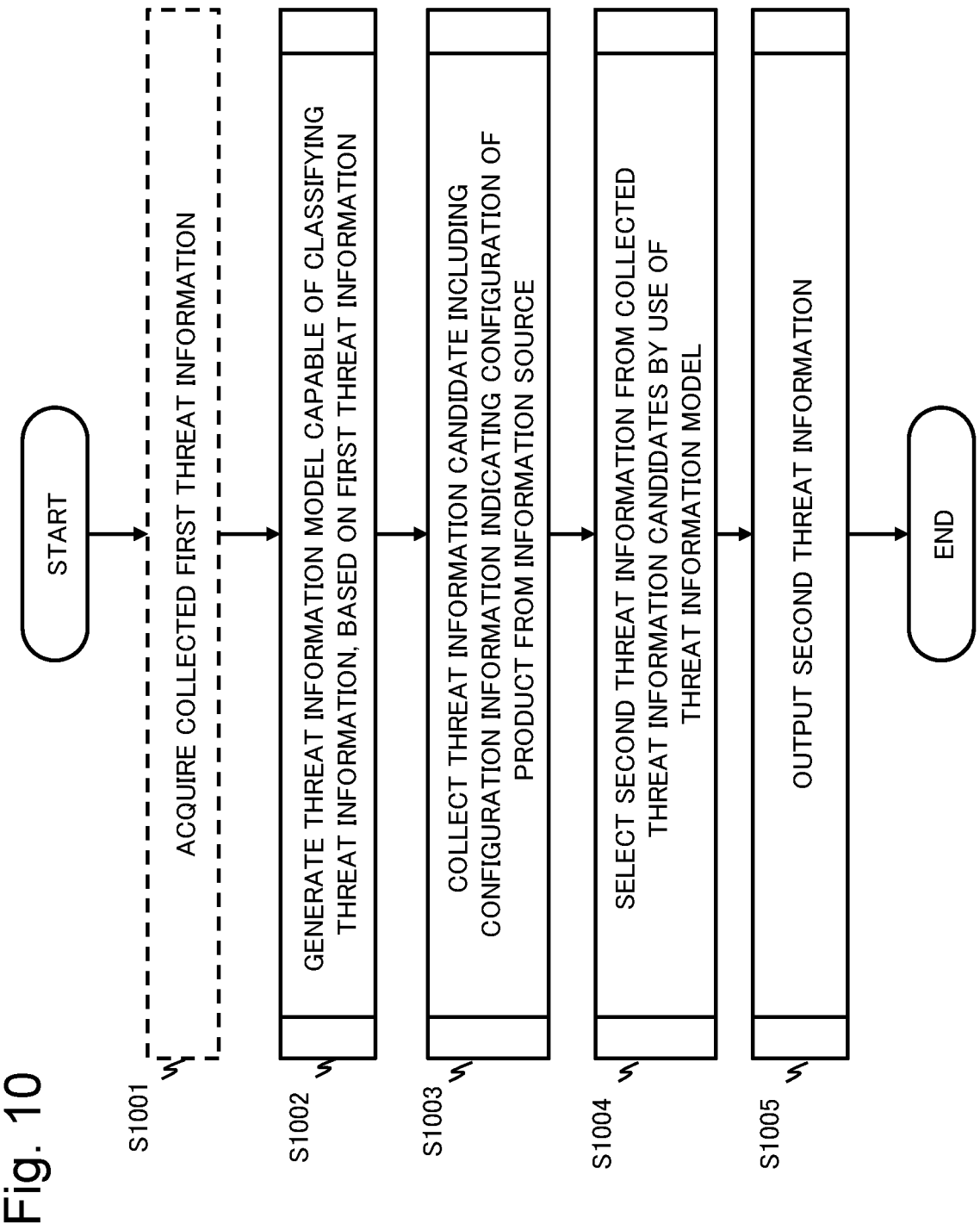
FIG. 10 is a flowchart (part 1) illustrating an example of an operation of the security information processing device according to the second example embodiment of the present disclosure.

Returning to the flowchart illustrated in FIG. 10, the description thereof will be continued.

Figure 12:
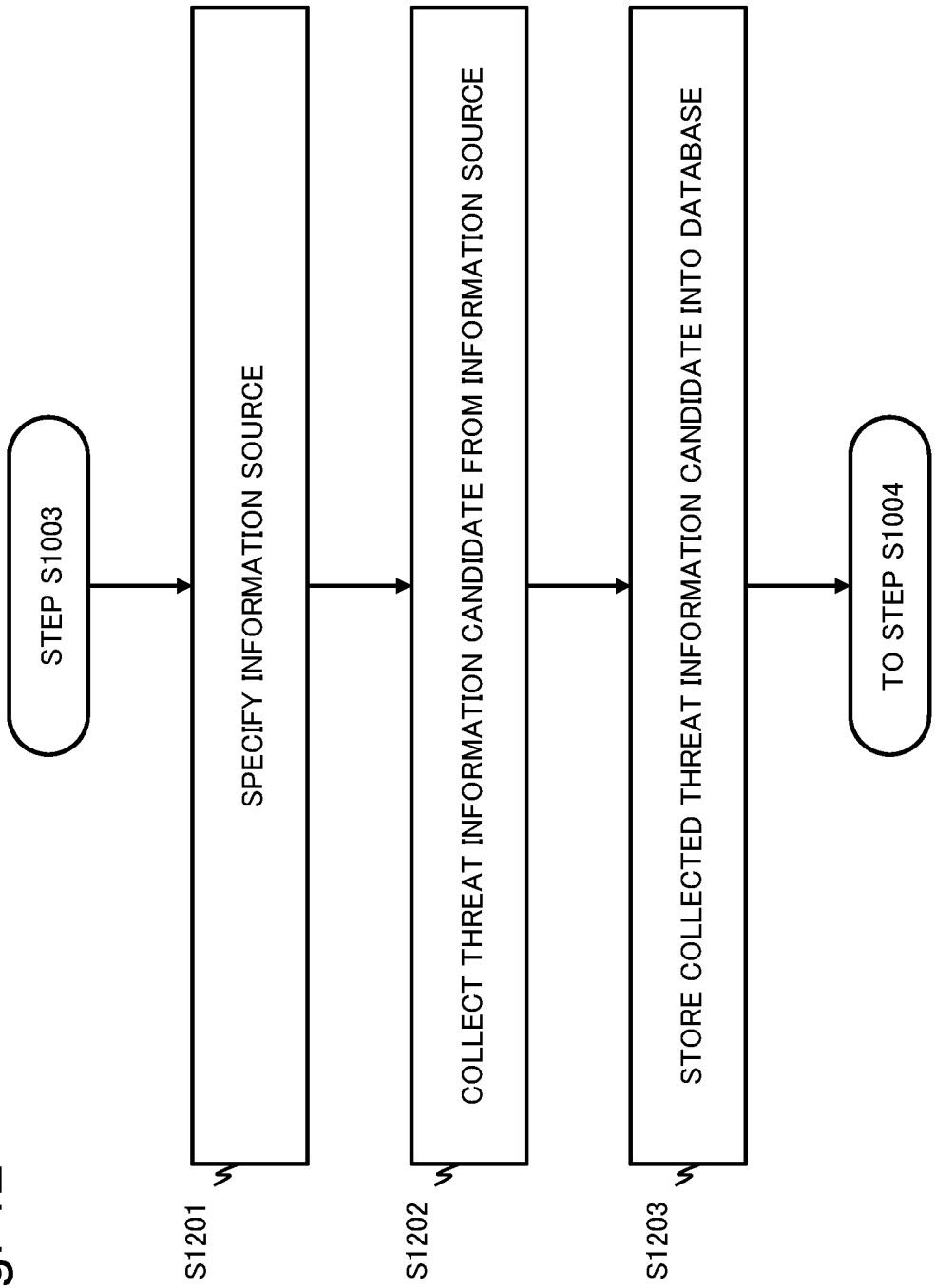
FIG. 12 is a flowchart (part 3) illustrating the example of the operation of the security information processing device according to the second example embodiment of the present disclosure.

The security information processing device 4000 (specifically, the collection unit 4002) collects a candidate for threat information including configuration information indicating a configuration of a product from the information source 4100 (Step S1003). The processing in Step S1003 will be described below with reference to a flowchart illustrated in FIG. 12.

The threat information collection unit 4002b in the collection unit 4002 refers to the collection site setting database 4002a and specifies an information source 4100 from which a threat information candidate is collected (Step S1201). Specifically, the threat information collection unit 4002b acquires a URL of an information source 4100 from the collection site setting database 4002a. For example, the collection site setting device 4400 may store information used for collection of a threat information candidate into the collection site setting database 4002a, according to the present example embodiment.

The threat information collection unit 4002b in the collection unit 4002 acquires a threat information candidate from the information source 4100 (Step S1202). As described above, the threat information collection unit 4002b may refer to the configuration information database 4003a and generate a search URL by replacing a query part of the URL acquired from the collection site setting database 4002a with component part data.

The threat information collection unit 4002b may repeat the processing of acquiring a threat information candidate from an information source 4100 according to a depth of search set to the collection site setting database 4002*a*.

The threat information collection unit 4002*b* stores the collected threat information candidate into the threat information candidate database 4002*c* (Step S1203).

Returning to the flowchart illustrated in FIG. 10, the description thereof will be continued.

Figure 13:
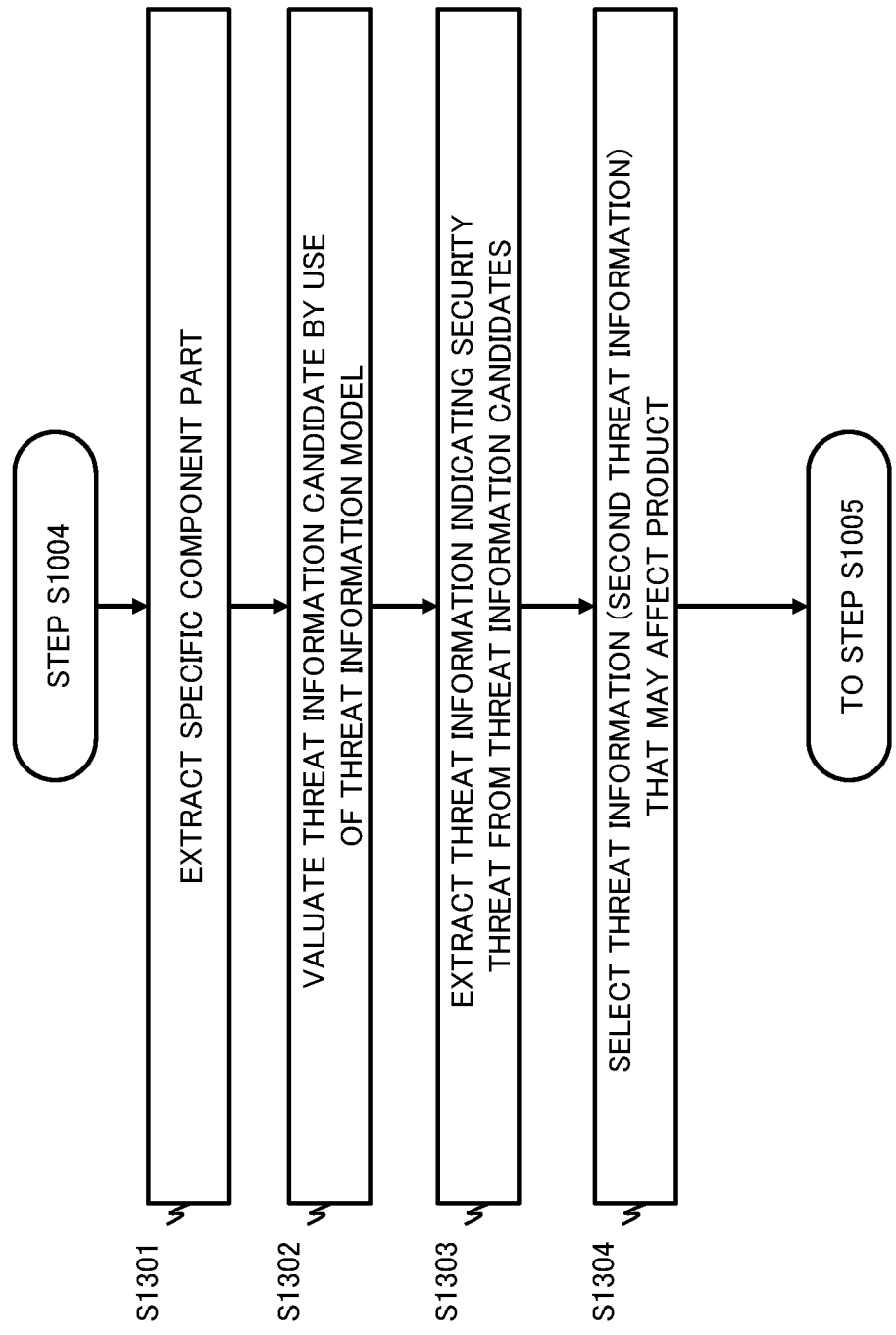
FIG. 13 is a flowchart (part 4) illustrating the example of the operation of the security information processing device according to the second example embodiment of the present disclosure.

The security information processing device 4000 (specifically, the detection unit 4003) selects second threat information indicating a security threat related to a product, by use of a threat information model generated by the threat information model generation unit 4001 from threat information collected by the collection unit 4002 (Step S1004). The processing in Step S1004 will be described below with reference to a flowchart illustrated in FIG. 13.

The affected range measurement unit 4003*b* in the detection unit 4003 refers to the known threat information database 4001*a* and extracts a characteristic term (a term indicating a characteristic component part constituting a product), and extracts a specific component part including the characteristic term from the configuration information database (Step S1301). At this time, the affected range measurement unit 4003*b* may extract a characteristic term from the configuration information database 4003*a*.

The unknown threat information extraction unit 4003*c* evaluates a threat information candidate registered in the threat information candidate database 4002*c*, by use of a threat information model stored in the threat information model database 4001*c* (Step S1302). Specifically, as described above, the unknown threat information extraction unit 4003*c* generates a feature value (document vector) from document data of a threat information candidate registered in the threat information candidate database 4002*c* and inputs the feature value to a threat information model. The threat information model calculates a value allowing determination of whether a feature value generated from a threat information candidate is threat information (more specifically, a probability of being threat information).

Based on the evaluation in Step S1302, the unknown threat information extraction unit 4003*c* extracts threat information indicating a security threat from the threat information candidate (Step S1303). Specifically, based on the value calculated by the threat information model, the unknown threat information extraction unit 4003*c* extracts threat information indicating a security threat from the threat information candidate.

Out of the threat information candidates extracted in Step S1303, the unknown threat information extraction unit 4003*c* selects threat information that may affect the product as second threat information (Step S1304). As described above, for example, out of the threat information candidates extracted in Step S1303, the unknown threat information extraction unit 4003*c* may select, as second threat information, a threat information candidate including information about the specific component part (such as a character string of a name indicating the specific component part) extracted by the affected range measurement unit 4003*b*.

Consequently, the unknown threat information extraction unit 4003*c* can select threat information that may affect a product [more specifically, a component (component part) constituting the product] as second threat information, out of the threat information candidates collected by the collection unit 4002. Further, the affected range measurement unit 4003*b* can extract a specific component part and a product including the specific component part from the configuration information database 4003*a*, and therefore can identify a range of products that may be affected by the second threat information.

The detection unit 4003 (specifically, the affected range measurement unit 4003*b* and the unknown threat information extraction unit 4003*c*) may provide the selected second threat information for the unknown threat information output unit 4004.

Returning to the flowchart illustrated in FIG. 10, the description thereof will be continued.

The security information processing device 4000 (specifically, the unknown threat information output unit 4004) outputs the second threat information selected in Step S1004 (Step S1005). For example, as described above, the unknown threat information output unit 4004 may output the second threat information to a display device, output the second threat information to a file, transmit the second threat information to another system or the like through a communication network, or print the second threat information.

The security information processing device 4000 according to the present example embodiment configured as described above enables efficient examination of a security threat that may affect a system. The reason is that, by use of a threat information model generated by use of known threat information (such as first threat information stored in the known threat information database 4001*a*), the security information processing device 4000 can select threat information that may affect a product (such as second threat information related to a product including a specific component part) out of candidates for threat information collected from information sources 4100 (such as threat information candidates stored in the threat information candidate database 4002*c*). In other words, the security information processing device 4000 can select useful information from unconfirmed threat information candidates by using a threat information model generated by use of known threat information that can be acquired relatively easily.

The collection unit 4002 can collect many threat information candidates in which useful information and non-useful information coexist, according to the number of information sources 4100 and an amount of information provided by each information source. For example, by using a threat information model learned by use of known threat information (first threat information), the security information processing device 4000 according to the present example embodiment can extract information that is highly likely to include a security threat (information similar to known threat information) out of the collected threat information candidates. Further, out of the extracted threat information candidates, the security information processing device 4000 (the detection unit 4003) can select a threat information candidate including information about a characteristic component part as second threat information. Consequently, the security information processing device 4000 can efficiently detect information (second threat information) including a security threat to a product, without manual work, out of unknown threat information candidates collected from various information sources and can efficiently examine the security threat that may affect the product.

Third Example Embodiment

Figure 14:
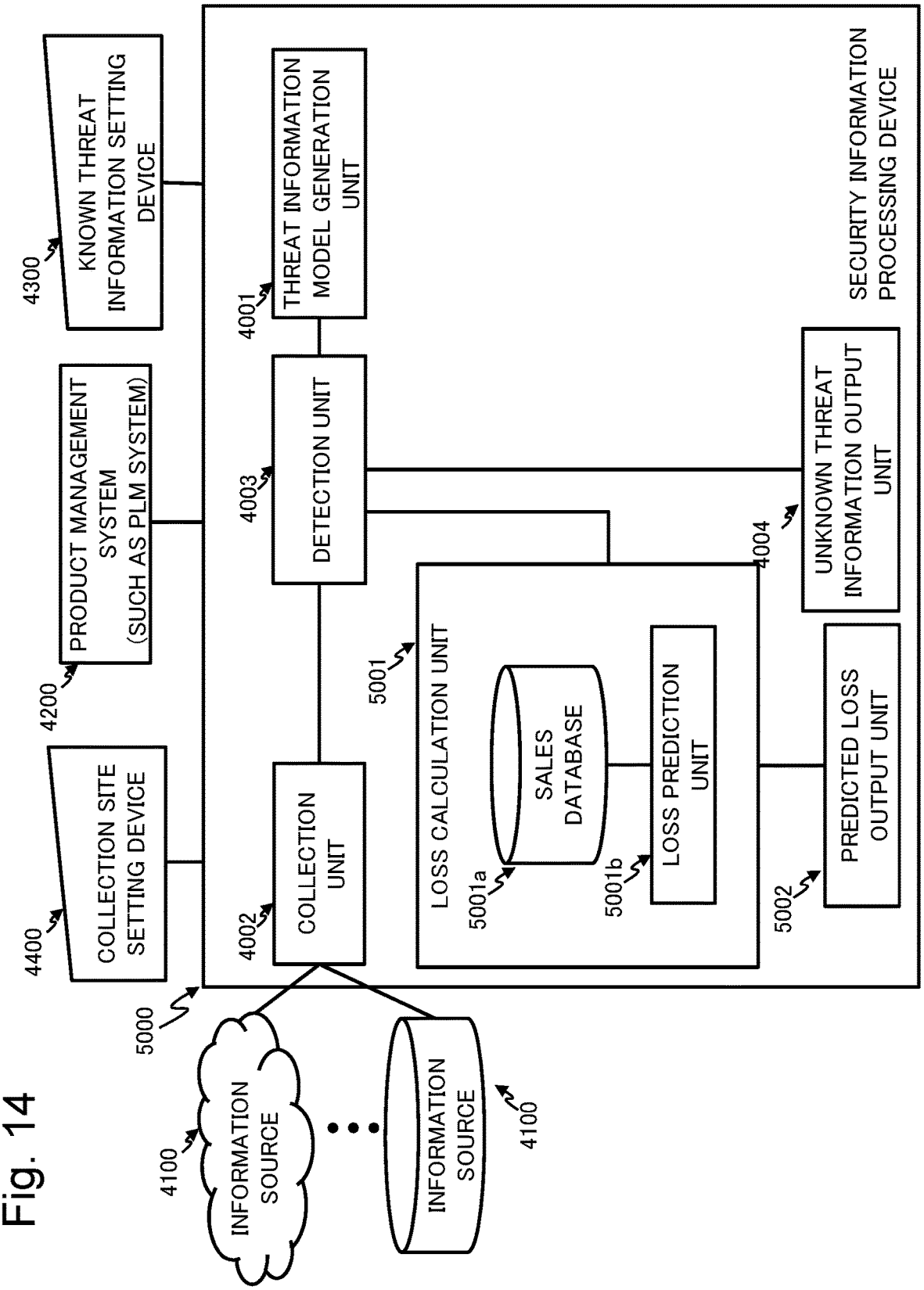
FIG. 14 is a block diagram illustrating a functional configuration of a security information processing device according to a third example embodiment of the present disclosure.

A third example embodiment of the technology according to the present disclosure will be described below. FIG. 14 is a block diagram illustrating a functional configuration of a security information processing device 5000 according to the third example embodiment.

The security information processing device 5000 according to the present example embodiment has a configuration corresponding to the security information processing device 4000 according to the second example embodiment and part of the configuration is further extended. Specifically, as illustrated in FIG. 14, the security information processing device 5000 may further include a loss calculation unit 5001 and a predicted loss output unit 5002 in addition to the security information processing device 4000 according to the second example embodiment. Other components constituting the security information processing device 5000 may be considered mostly similar to those of the security information processing device 4000 according to the second example embodiment. A main difference between the present example embodiment and the second example embodiment will be described below, and description of a configuration similar to that of the second example embodiment is omitted.

Loss Calculation Unit

The loss calculation unit 5001 (loss calculation means) calculates a possible loss related to a product that may be affected by second threat information detected (selected) by a detection unit 4003. The loss calculation unit 5001 includes a sales database 5001*a* and a loss prediction unit 5001*b*.

Figure 15:
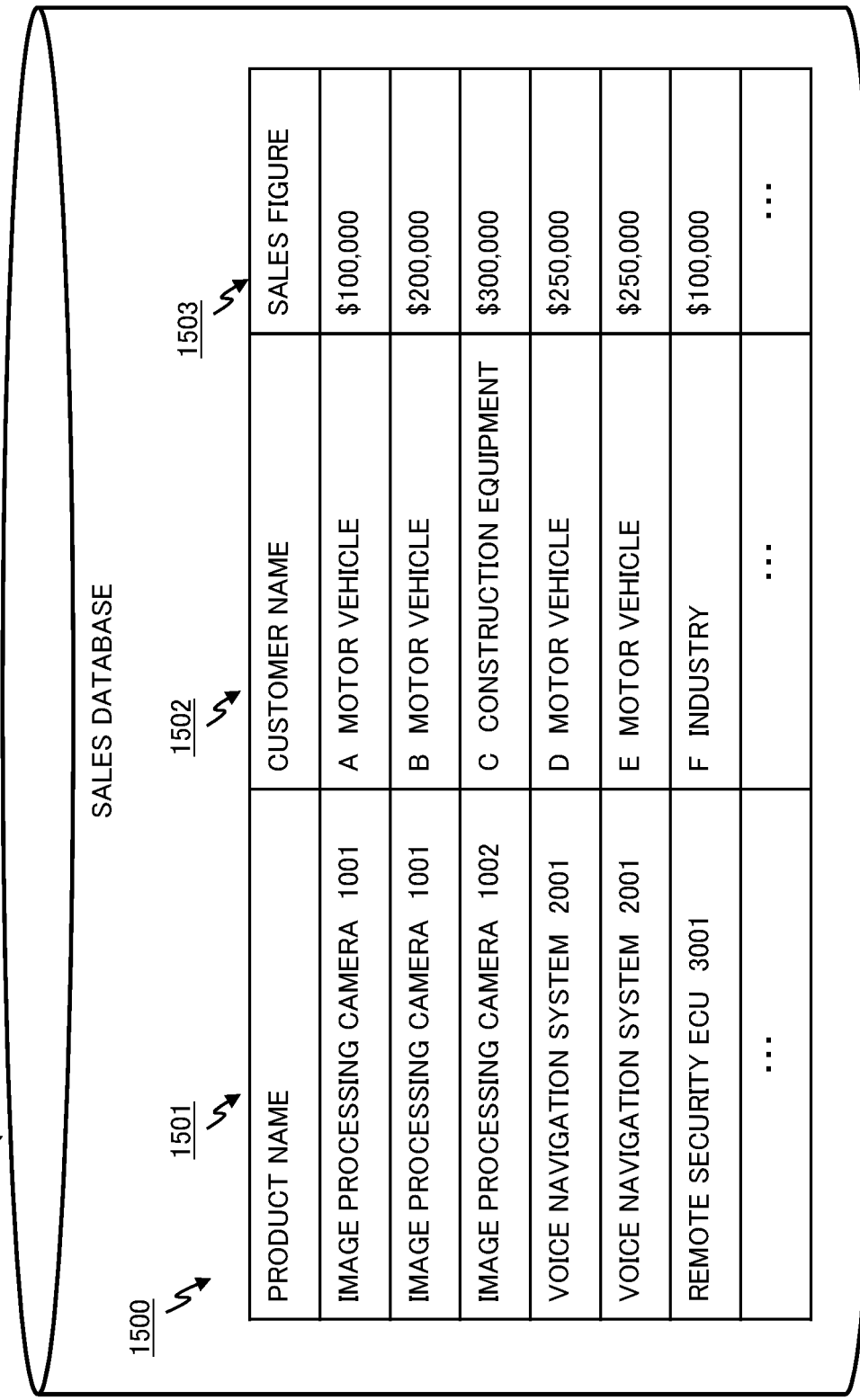
FIG. 15 is a diagram illustrating a specific example of a sales database.

The sales database 5001*a* is a database storing a sales figure related to a product and is configured to store a sales table 1500 in which a product name (1501 in FIG. 15), a customer name (1502 in FIG. 15), and a sales FIG. 1503 in FIG. 15) are registered as records, as illustrated in FIG. 15. The sales database 5001*a* may be hereinafter described as a "sales storage unit" (sales storage means). The same data as a product name (901 in FIG. 9) in the configuration table 900 in the configuration information database 4003*a* may be registered in a product name (1501). Data allowing specification of a customer purchasing a product (such as a name and/or an identification number of the customer) may be registered in a customer name (1502). A sales amount of a product may be registered in a sales FIG. 1503).

For example, data stored in the sales database 5001*a* may be provided from a product management system 4200. Specifically, when sales information of a product managed in the product management system 4200 is updated, the product management system 4200 may update a content of the sales database 5001*a*. Further, the loss calculation unit 5001 may refer to sales information of a product managed in the product management system 4200 and update the sales database 5001*a*. While the sales database 5001*a* is included in the loss calculation unit 5001 in the specific example illustrated in FIG. 14, the present example embodiment is not limited to the above. Specifically, the sales database 5001*a* may not be provided in the loss calculation unit 5001, and the loss prediction unit 5001*b* (to be described later) may directly refer to sales information managed in the product management system 4200, according to the present example embodiment.

The loss prediction unit 5001*b* is configured to specify a product that may be affected by second threat information selected in the detection unit 4003 and calculate a possible loss related to the product as a predicted loss amount. Specifically, the loss prediction unit 5001*b* receives information allowing identification of a product affected by second threat information from the detection unit 4003 and, referring to a sales figure registered in the sales database 5001*a*, calculates a loss amount related to the product affected by the second threat information. Specific processing by the loss prediction unit 5001*b* will be described later.

The predicted loss output unit 5002 (predicted loss display means) outputs a loss amount calculated by the loss calculation unit 5001. A target (output destination) to which the predicted loss output unit 5002 outputs a calculated loss amount is not particularly limited and may be appropriately selected. As an example, the predicted loss output unit 5002 may output a loss amount to, for example, a display device displaying a user interface capable of displaying various types of information to a user of the security information processing device 5000. As another example, the predicted loss output unit 5002 may, for example, output a calculated loss amount to a file in a file system, transmit the calculated loss amount to another system or the like through a communication network, or output the calculated loss amount as a printed matter through a printing device. An unknown threat information output unit 4004 and the predicted loss output unit 5002 may be separately provided as illustrated in FIG. 14 or may be integrated.

Operation

Figure 16:
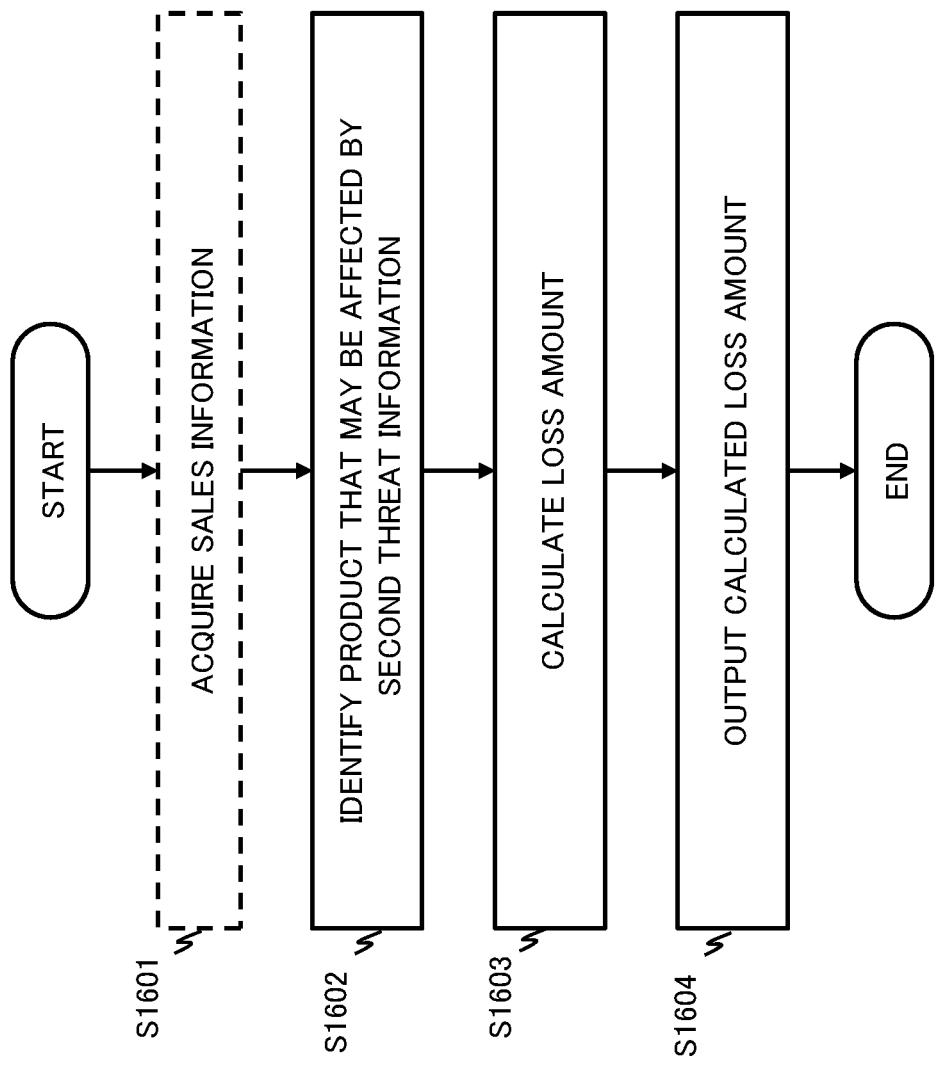
FIG. 16 is a flowchart illustrating an example of an operation of the security information processing device according to the third example embodiment of the present disclosure.

An operation of the security information processing device 5000 according to the present example embodiment configured as described above will be described below with reference to a flowchart illustrated in FIG. 16. Operations of the loss calculation unit 5001 and the predicted loss output unit 5002 will be mainly described below. Operations of the other components constituting the security information processing device 5000 may be considered mostly similar to those of the aforementioned second example embodiment.

The loss calculation unit 5001 acquires sales data managed in the product management system 4200 and stores the sales data into the sales database 5001*a* (Step S1601).

The loss calculation unit 5001 (the loss prediction unit 5001*b*) identifies a product that may be affected by second threat information (Step S1602). Specifically, the loss prediction unit 5001*b* may receive, from the detection unit 4003, information allowing identification of a product that may be affected by the second threat information, the product being identified by an affected range measurement unit 4003*b*.

The loss prediction unit 5001*b* calculates a loss amount related to the product that may be affected by the second threat information (Step S1603).

Specifically, the loss prediction unit 5001*b* extracts a row including a product affected by the second threat information, in the sales table 1500 stored in the sales database 5001*a*. The loss prediction unit 5001*b* calculates a predicted direct loss amount for each extracted row. An estimated direct loss amount is an estimated value of a possible direct loss related to a product affected by second threat information in a case of a security threat specified by the second threat information becoming apparent.

A method of calculating an estimated direct loss amount is not particularly limited and a suitable method may be selected. As an example, by use of Equation (1), the loss prediction unit 5001*b* may calculate an estimated direct loss amount for each row (product) extracted from the sales table 1500.

Math. 1

$$\text{(Estimated direct loss amount)} = \text{(Sales figure)} \times \text{(Total number of pieces of threat information related to a part included in a product)}^A \quad (1)$$

As described above, one product may include a plurality of components (parts). One piece of second threat information may affect a plurality of products [more specifically, components (parts) constituting products], and one product may be affected by a plurality of pieces of second threat information. In other words, the number pieces of second threat information that may affect a product is the total number of pieces of second threat information that may affect one or more parts (specific component parts) included in the product. Accordingly, in Equation (1), an estimated direct loss amount related to a product is calculated considering the total number of pieces of threat information related to one or more parts included in the product. In Equation (1), "A" denotes a set value that can be appropriately selected. For example, a value of "A" may be appropriately set based on an empirical rule, or a suitable value may be determined by a preliminary experiment or the like. As an example, "0.02" may be set as a value of "A."

Furthermore, for example, the loss prediction unit 5001b may calculate an estimated direct loss amount for each product. In this case, the loss prediction unit 5001b may totalize values calculated by Equation (1) for each product. It is assumed in the specific example illustrated in FIG. 15 that an estimated direct loss amount related to an "image processing camera 1001" is calculated. In this case, the loss prediction unit 5001b may totalize an estimated direct loss amount calculated from the first row of the sales table and an estimated direct loss amount calculated from the second row.

Furthermore, for example, the loss prediction unit 5001b may calculate an estimated direct loss amount for each customer. In this case, the loss prediction unit 5001b may calculate an estimated direct loss amount for each product, refer to the sales table 1500, and totalize estimated direct loss amounts for each customer.

Furthermore, for example, the loss prediction unit 5001b may calculate an estimated direct loss amount for each piece of second threat information. In this case, the loss prediction unit 5001b may identify a product related to each piece of second threat information (a product including a part affected by a piece of second threat information) and totalize estimated direct loss amounts related to the products.

The predicted loss output unit 5002 outputs the estimated direct loss amount calculated in the loss calculation unit 5001 (Step S1604). As described above, for example, the predicted loss output unit 5002 may display the estimated direct loss amount calculated in the loss calculation unit 5001 on a display device, save the amount in a file, transmit the amount to another system through a communication network, or print the amount.

The security information processing device 5000 configured as described above can calculate an estimated loss amount in a case of a threat becoming apparent (estimated direct loss amount). Consequently, for example, a user of the security information processing device 5000 can study a principle of security measures, based on a calculated estimated direct loss amount. Specifically, a user can confirm the total amount of a possible loss caused by second threat information selected by the detection unit 4003. When an estimated direct loss amount for each product is provided, for example, a user of the security information processing device 5000 can execute security measures from a product with a larger estimated direct loss amount. When an estimated direct loss amount for each customer is provided, for example, a user of the security information processing device 5000 can execute security measures from a product for a customer with a larger estimated direct loss amount.

The security information processing device 5000 has a configuration mostly similar to that of the security information processing device 4000 according to the second example embodiment and therefore can efficiently examine a security threat that may affect a system.

Configurations of Hardware and Software Program (Computer Program)

A hardware configuration capable of providing each example embodiment described above will be described below. The security information processing devices (100/4000/5000) described in the aforementioned example embodiments are collectively described as "security information processing devices" in the following description.

Each security information processing device described in each of the aforementioned example embodiments may be configured with one or a plurality of dedicated hardware devices. In that case, the components illustrated in the aforementioned diagrams (such as FIGS. 1, 4, and 14) may be provided as hardware integrating the components in part or in whole (such as an integrated circuit on which processing logic is implemented). For example, when the security information processing device is provided with a hardware device, a component of the security information processing device may be implemented as an integrated circuit [such as a system on a chip (SoC)] capable of providing the function of each component. In this case, for example, data included in a component of the security information processing device may be stored in a random access memory (RAM) area or a flash memory area integrated on the SoC.

In this case, for example, the security information processing device may be provided by use of one or more pieces of processing circuitry capable of providing the functions of the threat information model generation units (101/4001), the collection units (102/4002), the detection units (103/4003), the unknown threat information output unit 4004, the loss calculation unit 5001, and the predicted loss output unit 5002, communication circuitry, and storage circuitry. Various variations are assumed in implementation of a circuit configuration providing the security information processing device. When the security information processing device is configured with a plurality of hardware devices, the hardware devices may be communicably connected to one another by a suitable communication method (wired, wireless or a combination thereof).

Figure 17:
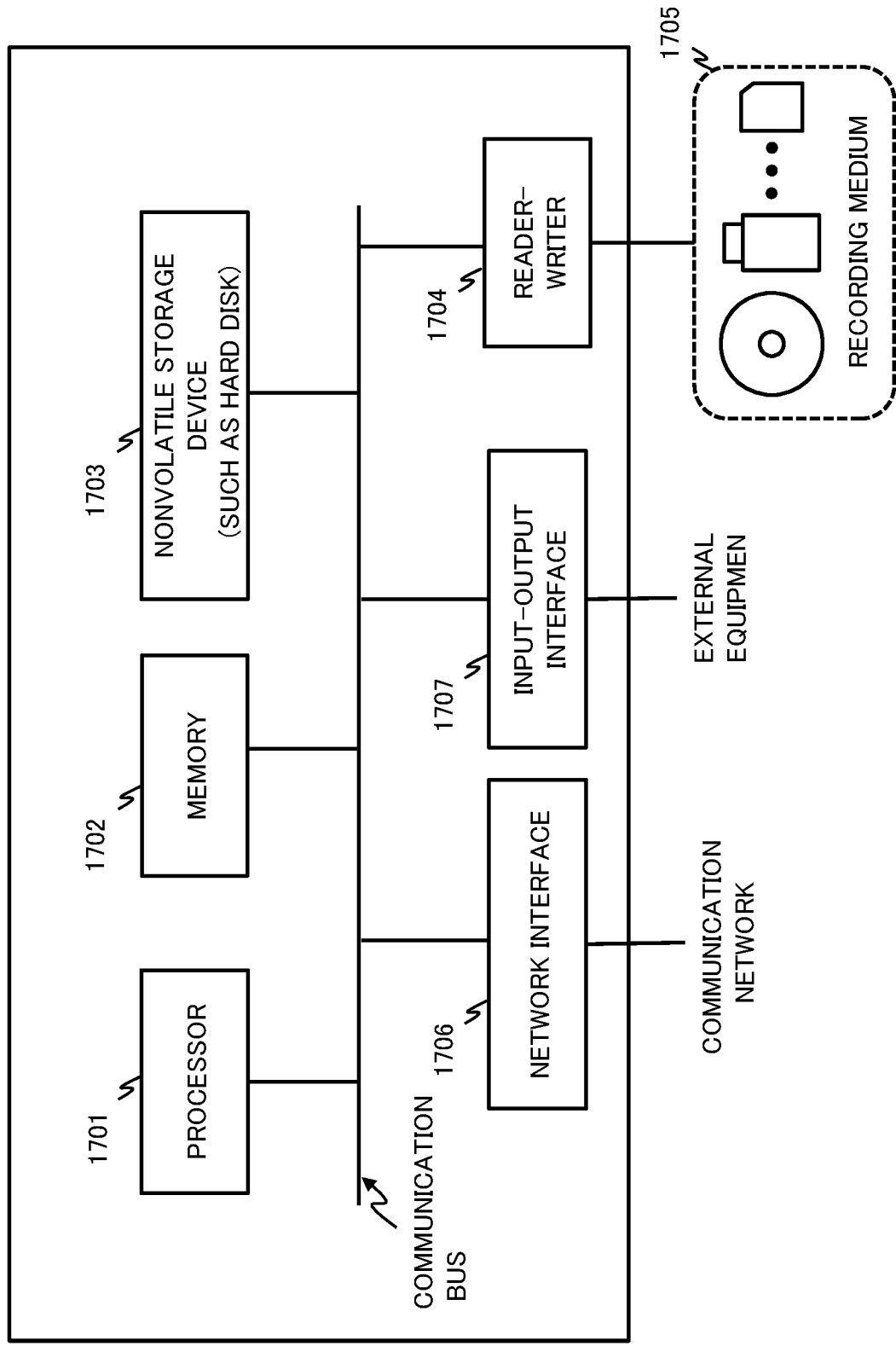
FIG. 17 is a diagram illustrating a configuration of a hardware device capable of providing each example embodiment of the present disclosure.

The aforementioned security information processing device may be configured with a general-purpose hardware device 1700 as illustrated in FIG. 17 and various software programs (computer programs) executed by the hardware device 1700. In this case, the security information processing device may be configured with a suitable number (one or more) of hardware devices 1700 and software programs.

For example, a processor 1701 in FIG. 17 is a general-purpose central processing unit (CPU) or a microprocessor. For example, the processor 1701 may read various software programs stored in a nonvolatile storage device 1703 to be described later into a memory 1702 and execute processing in accordance with the software program. In this case, for example, a component of the security information processing devices according to the aforementioned example embodiments can be provided as a software program executed by the processor 1701.

In this case, for example, the security information processing device according to each of the aforementioned example embodiments may be provided by one or more programs capable of providing the functions of the threat information model generation units (101/4001), the collection units (102/4002), the detection units (103/4003), the unknown threat information output unit 4004, the loss calculation unit 5001, and the predicted loss output unit 5002. Various variations are assumed in implementation of such programs.

The memory 1702 is a memory device referenceable from the processor 1701, such as a RAM, and stores a software program, various data, and the like. The memory 1702 may be a volatile memory device.

For example, the nonvolatile storage device 1703 is a nonvolatile storage device such as a magnetic disk drive or a semiconductor storage device (such as a flash memory). The nonvolatile storage device 1703 is capable of storing various software programs, data, and the like. For example, various databases in the aforementioned security information processing devices may be stored in the nonvolatile storage device 1703.

For example, a reader-writer 1704 is a device processing reading and writing of data from and into a recording medium 1705 to be described later. For example, the security information processing device may read first threat information recorded in the recording medium 1705 through the reader-writer 1704.

For example, the recording medium 1705 is a recording medium capable of recording data, such as an optical disk, a magneto-optical disk, and a semiconductor flash memory. A type and a recording method (format) of the recording medium is herein not particularly limited and may be appropriately selected.

A network interface 1706 is an interface device connected to a communication network and may employ, for example, a wired and wireless local area network (LAN) connection interface device or the like. For example, the security information processing device may be communicably connected to various information sources 4100, the product management system 4200, the known threat information setting device 4300, and the collection site setting device 4400 through the network interface 1706.

An input-output interface 1707 is a device controlling input and output from and to an external device. For example, an external device may be input equipment (such as a keyboard, a mouse, and a touch panel) capable of receiving an input from a user. Further, for example, an external device may be output equipment (such as a monitor screen and a printer) capable of presenting various outputs to a user. For example, the unknown threat information output unit 4004 and the predicted loss output unit 5002 in the security information processing device may output various data through the input-output interface.

For example, the technology according to the present disclosure may be provided by the processor 1701 executing a software program supplied to the hardware device 1700. In this case, an operating system and/or middleware such as database management software and network software operating on the hardware device 1700 may execute part of the processing.

In the aforementioned example embodiments, each unit illustrated in the aforementioned diagrams may be provided as a software module being a function (processing) unit of a software program executed by the aforementioned hardware. For example, when the aforementioned units are provided as software modules, the software modules may be stored in the nonvolatile storage device 1703. Then, the processor 1701 may read the software modules into the memory 1702 when executing each type of processing. The software modules may be configured to be able to mutually transfer various data by an appropriate method such as a shared memory or interprocess communication.

Furthermore, the aforementioned software programs may be recorded in the recording medium 1705. In this case, the aforementioned software programs may be installed into the hardware device 1700 by use of an appropriate jig (tool). Various software programs may be externally downloaded through a communication line such as the Internet. Various common procedures may be employed as a method of supplying the software programs.

In such a case, the technology according to the present disclosure may be configured with a code constituting a software program or a computer-readable recording medium having the code recorded thereon. In this case, the recording medium may be a non-transitory recording medium independent of the hardware device 1700 or may be a recording medium storing or temporarily storing a downloaded software program transmitted through a LAN, the Internet and/or the like.

Further, the aforementioned security information processing device or a component of the security information processing device may be configured with a virtualized environment in which the hardware device 1700 illustrated in FIG. 17 is virtualized and a software program (computer program) executed in the virtualized environment. In this case, a component of the hardware device 1700 illustrated in FIG. 17 is provided as a virtual device in the virtualized environment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100, 4000, 5000 Security information processing device
101, 4001 Threat information model generation unit
102, 4002 Collection unit
103, 4003 Detection unit
4004 Unknown threat information output unit
4100 Information source
4200 Product management system
4300 Known threat information setting device
4400 Collection site setting device
5001 Loss calculation unit
5002 Predicted loss output unit
1701 Processor
1702 Memory
1703 Nonvolatile storage device
1704 Reader-writer
1705 Recording medium
1706 Network interface
1707 Input-output interface

The invention claimed is:

1. A security information processing device comprising:
a memory storing instructions; and
one or more processors configured to execute the instructions to:

generate, by use of first threat information including threat information indicating a threat related to security, a threat information model capable of classifying a piece of information as the threat information;

collect one or more threat information candidates each being a candidate for the threat information, from an information source providing information related to security;

detect, by use of information about a component constituting a product and the threat information model, second threat information including the threat information that affects the product, from the collected one or more threat information candidates;

when detecting the second threat information, out of the collected one or more threat information candidates, extract one or more threat information candidates classified as the threat information by the threat information model, and, out of the extracted one or more threat information candidates, select a threat information candidate including the information about the component constituting the product as the second threat information that affects a configuration of the product;

when collecting the one or more threat information candidates, acquire component part data representing a component part being the component constituting the product, and collect the one or more threat information candidates by retrieving information including the component part data at the information source, and, when extracting the one or more threat information candidates, out of the collected one or more threat information candidates including the component part data, extract the one or more threat information candidates classified as the threat information by the threat information model.

2. The security information processing device according to claim claim 1, wherein the threat information model is a model capable of calculating a probability that document data representing the piece of information is the threat information, and the one or more processors are configured to execute the instructions to: when detecting the second threat information, determine whether each of the one or more threat information candidates is classified as the threat information, based on the probability calculated from corresponding one of the one or more threat information candidates by use of the threat information model.

3. The security information processing device according to claim claim 1, wherein the one or more processors are further configured to execute the instructions to:

store pieces of the component part data included in the product, and when detecting the second threat information, extract a specific term from the first threat information, out of the pieces of the component part data stored in the configuration information storage means, specify a piece of the component part data relating to the specific term, as a specific component part, and, out of the one or more threat information candidates classified as the threat information by the threat information model, select a threat information candidate including the specific component part as the second threat information.

4. The security information processing device according to claim 1, wherein the one or more processors are further configured to execute the instructions to:

refer to sales storage means for storing a product and a sales figure of the product, and identifying a product that is affected by the second threat information detected by the detection means, and calculate a loss amount in a case of a threat indicated by the second threat information becoming apparent, from the sales figure of the identified product.

5. An information processing method comprising, by an information processing device:

generating, by use of first threat information including threat information indicating a threat related to security, a threat information model capable of classifying a piece of information as the threat information;

collecting one or more threat information candidates each being a candidate for the threat information, from an information source providing information related to security; and detecting, by use of information about a component constituting a product and the threat information model, second threat information including the threat information that affects the product, from the collected one or more threat information candidates;

wherein detecting the second threat information includes:

out of the collected one or more threat information candidates, extracting one or more threat information candidates classified as the threat information by the threat information model; and, out of the extracted one or more threat information candidates, selecting a threat information candidate including the information about the component constituting the product as the second threat information that affects a configuration of the product;

wherein collecting the one or more threat information candidates includes:

acquiring component part data representing a component part being the component constituting the product, and collecting the one or more threat information candidates by retrieving information including the component part data at the information source, and, wherein extracting the one or more threat information candidates, out of the collected one or more threat information candidates including the component part data, includes extracting the one or more threat information candidates classified as the threat information by the threat information model.

6. A non-transitory recording medium having a computer program recorded thereon, the computer program causing a computer to execute:

processing of generating, by use of first threat information including threat information indicating a threat related to security, a threat information model capable of classifying a piece of information as the threat information;

processing of collecting one or more threat information candidates each being a candidate for the threat information, from an information source providing information related to security; and processing of detecting, by use of information about a component constituting a product and the threat information model, second threat information including the threat information that affects the product, from the collected one or more threat information candidates;

wherein processing of detecting the second threat information includes:

processing of, out of the collected one or more threat information candidates, extracting one or more threat information candidates classified as the threat information by the threat information model; and processing of, out of the extracted one or more threat information candidates, selecting a threat information candidate including information about the component constituting the product as the second threat information that affects a configuration of the product;

wherein processing of collecting the one or more threat information candidates includes:

processing of acquiring component part data representing a component part being the component constituting the product, and processing of collecting the one or more threat information candidates by retrieving information including the component part data at the information source, and, wherein processing of extracting the one or more threat information candidates, out of the collected one or more threat information candidates including the component part data, includes processing of extracting the one or more threat information candidates classified as the threat information by the threat information model.

* * * * *